US011732751B2

(12) United States Patent
Hagiwara et al.

(10) Patent No.: US 11,732,751 B2
(45) Date of Patent: Aug. 22, 2023

(54) ROTARY MACHINING APPARATUS, METHOD OF MANUFACTURING HUB UNIT BEARING, AND METHOD OF MANUFACTURING VEHICLE

(71) Applicant: NSK LTD., Tokyo (JP)

(72) Inventors: Nobuyuki Hagiwara, Fujisawa (JP); Tokumasa Kikuchi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/975,212

(22) PCT Filed: Feb. 25, 2019

(86) PCT No.: PCT/JP2019/006990
§ 371 (c)(1),
(2) Date: Aug. 24, 2020

(87) PCT Pub. No.: WO2019/163982
PCT Pub. Date: Aug. 29, 2019

(65) Prior Publication Data
US 2020/0392988 A1    Dec. 17, 2020

(30) Foreign Application Priority Data

Feb. 26, 2018 (JP) ................................. 2018-032487
Mar. 22, 2018 (JP) ................................. 2018-054018
Feb. 5, 2019 (JP) ................................. 2019-018458

(51) Int. Cl.
  *B60B 27/00*   (2006.01)
  *B21D 53/26*   (2006.01)
  (Continued)

(52) U.S. Cl.
  CPC ............ *F16C 19/186* (2013.01); *B21D 53/10* (2013.01); *B21D 53/26* (2013.01); *B21K 1/05* (2013.01);
  (Continued)

(58) Field of Classification Search
  CPC ....... F16C 2226/52; B21D 53/26; B21K 1/40; B21K 25/00; B23P 11/005; B60B 27/0084; B21J 9/06; B21J 9/025
  See application file for complete search history.

(56) References Cited

U.S. PATENT DOCUMENTS 3,703,823 A    11/1972   Wilson
5,435,414 A     7/1995   Barrett
(Continued)

FOREIGN PATENT DOCUMENTS

CN         2134900 Y     6/1993
CN       102381139 A     3/2012
(Continued)

OTHER PUBLICATIONS

Written Opinion of the International Searching Authority for International Application No. PCT/JP2019/006990 (Year: 2019).*
(Continued)

*Primary Examiner* — Christopher J Besler
(74) *Attorney, Agent, or Firm* — Sughrue Mion, PLLC

(57) ABSTRACT

Provided are an oil pan (20) which has an annular recess portion (52) facing an outer circumferential edge of a spherical concave portion (36) throughout a whole circumference; and a cover (21) which is constituted in a tubular shape, of which one axial end portion is rotatably supported by a part adjacent to a radially inner side of the annular recess portion (52), and of which an axially opposite end portion is rotatably supported by a part of a shaft-equipped spherical seat (18) on the one axial end side.

2 Claims, 11 Drawing Sheets

(51) Int. Cl.
*B21K 1/40* (2006.01)
*B21K 25/00* (2006.01)
*B23P 11/00* (2006.01)
*B21J 9/02* (2006.01)
*F16C 19/18* (2006.01)
*B23P 17/00* (2006.01)
*B21K 1/05* (2006.01)
*B21D 53/10* (2006.01)
*F16C 43/04* (2006.01)
*B21J 9/06* (2006.01)

(52) U.S. Cl.
CPC ............. *B21K 1/40* (2013.01); *B21K 25/00* (2013.01); *B23P 11/005* (2013.01); *B23P 17/00* (2013.01); *B60B 27/0084* (2013.01); *B21J 9/025* (2013.01); *B21J 9/06* (2013.01); *B60B 2380/12* (2013.01); *F16C 43/04* (2013.01); *F16C 2226/52* (2013.01); *F16C 2326/02* (2013.01)

(56) References Cited

U.S. PATENT DOCUMENTS

| | | | |
|---|---|---|---|
| 2002/0038563 A1 | 4/2002 | Steinmetz et al. | |
| 2005/0018937 A1 | 1/2005 | Lagorgette | |
| 2017/0209914 A1* | 7/2017 | Hagiwara | B21J 9/025 |
| 2018/0202495 A1* | 7/2018 | Hagiwara | F16C 43/08 |

FOREIGN PATENT DOCUMENTS

| | | | | |
|---|---|---|---|---|
| CN | 102667147 | A | 9/2012 | |
| CN | 104100826 | A | 10/2014 | |
| CN | 105531050 | A | 4/2016 | |
| CN | 107709806 | A | 2/2018 | |
| CN | 107735193 | A | 2/2018 | |
| GB | 319065 | A | 9/1929 | |
| JP | 50-048841 | U | 5/1975 | |
| JP | 57-007343 | A | 1/1982 | |
| JP | 60-250836 | A | 12/1985 | |
| JP | 02-251330 | A | 10/1990 | |
| JP | 04-200947 | A | 7/1992 | |
| JP | 6-285576 | A | 10/1994 | |
| JP | 7-251232 | A | 10/1995 | |
| JP | 2001-241450 | A | 9/2001 | |
| JP | 2005-172049 | A | 6/2005 | |
| JP | 2013-091067 | A | 5/2013 | |
| JP | 2014-133254 | A | 7/2014 | |
| JP | 2016-165735 | A | 9/2016 | |
| WO | 2004/001247 | A1 | 12/2003 | |
| WO | WO-2016013668 | A1 * | 1/2016 | ............. B21J 9/025 |
| WO | WO-2017010481 | A1 * | 1/2017 | ............. B21D 39/00 |

OTHER PUBLICATIONS

European Search Report for EP 19 75 7158 dated May 20, 2020.
European Search Report for EP 19 75 6844 dated May 26, 2020.
International Search Report for PCT/JP2019/007031 dated May 14, 2019.
International Search Report for PCT/JP2019/006990 dated May 14, 2019 [PCT/ISA/210].
European Search Report for EP 19 75 7158 dated May 19, 2020.
Communication dated Dec. 2, 2021 from the China National Intellectual Property Administration in Chinese Application No. 201980015204.3.
Search Report dated Sep. 15, 2021 from The State Intellectual Property Office of the P.R. of China in Application No. 2019800152467.
Office Action dated Oct. 20, 2022 issued by the US Patent Office in U.S. Appl. No. 16/975,232.
Communication dated Jan. 17, 2023, issued in Japanese Application No. 2019-165540.

* cited by examiner

ROTARY MACHINING APPARATUS, METHOD OF MANUFACTURING HUB UNIT BEARING, AND METHOD OF MANUFACTURING VEHICLE

CROSS REFERENCE TO RELATED APPLICATIONS

This application is a National Stage of International Application No. PCT/JP2019/006990 filed Feb. 25, 2019, claiming priority based on Japanese Patent Application No. 2018-032487, filed Feb. 26, 2018, Japanese Patent Application No. 2018-054018, filed Mar. 22, 2018, and Japanese Patent Application No. 2019-018458, filed Feb. 5, 2019.

TECHNICAL FIELD

The present invention relates to an rotary machining apparatus, for example, which can be used for forming a caulking portion obtained by causing a cylindrical portion provided in an axial end portion of a shaft member to be plastically deformed radially outward.

BACKGROUND ART

A wheel of a vehicle is supported by a hub unit bearing 100 to be able to rotate with respect to a suspension system, for example, as shown in FIG. 13.

The hub unit bearing 100 includes an outer ring 102 which is coupled and fixed to a knuckle 101 constituting the suspension system and does not rotate when in use, a wheel 103 which constitutes a wheel of the vehicle when in use, a hub 105 in which a braking rotor 104 such as a disk or a drum is supported and fixed and which rotates together with the wheel 103 and the braking rotor 104, and a plurality of rollers 106.

The outer ring 102 includes a plurality of rows of outer ring trajectories 107a and 107b and a stationary flange 108. The plurality of rows of outer ring trajectories 107a and 107b are individually formed on an inner circumferential surface of an axially intermediate portion of the outer ring 102, The stationary flange 108 is formed in the axially intermediate portion of the outer ring 102 to protrude radially outward and has support holes 109 (screw holes) at a plurality of places in a circumferential direction. The outer ring 102 is coupled and fixed to the knuckle 101 by screwing and fastening bolts 111 inserted through via holes 110 formed in the knuckle 101 into the support holes 109 of the stationary flange 108 from an axially inner side.

The hub 105 is disposed coaxially with the outer ring 102 on a radially inner side of the outer ring 102, a plurality of rows of inner ring trajectories 112a and 112b, and a rotation flange 113. The plurality of rows of inner ring trajectories 112a and 112b are formed in parts of an outer circumferential surface of the hub 105 facing the plurality of rows of outer ring trajectories 107a and 107b. The rotation flange 113 is formed in a part of the huh 105 positioned on a side axially outward from an axially outer end portion of the outer ring 102 to protrude radially outward and has attachment holes 114 at a plurality of places in the circumferential direction. The braking rotor 104 is coupled and fixed to the rotation flange 113 of the hub 105 by press-fitting a serration portion formed in a part near a base end of a stud 115 into the attachment hole 114 of the rotation flange 113 and press-fitting an intermediate portion of the stud 115 into a via hole 116 formed in the braking rotor 104, Moreover, the wheel is coupled and fixed to the rotation flange 113 by screwing and fastening a nut 118 to the male screw portion in a state where a male screw portion formed in a distal end portion of the stud 115 is inserted through a via hole 117 formed in the wheel 103.

The plurality of rollers 106 are disposed to be able to roll in each of the rows between the plurality of rows of outer ring trajectories 107a and 107b and the plurality of rows of inner ring trajectories 112a and 112b in a state of being individually held by retainers 119.

In the shown example, the hub 105 is constituted by causing a hub main body 120 having an inner ring trajectory 112a on the axially outer side (left side in FIG. 13) and an inner ring 121 having an inner ring trajectory 112b on the axially inner side (right side in FIG. 13) which are coupled and fixed to each other. Specifically, in a state where the inner ring 121 is externally fitted to a part near an axially inner end of the hub main body 120, the hub main body 120 and the inner ring 121 are coupled and fixed to each other by restraining an axially inner end surface of the inner ring 121 using a caulking portion 123 obtained by causing an axially inner end portion of a cylindrical portion 122 provided in an axially inner end portion of the hub main body 120 to be plastically deformed radially outward.

When the caulking portion 123 is formed by causing the axially inner end portion of the cylindrical portion 122 of the hub main body 120 to be plastically deformed (caulking and spreading) radially outward, for example, an rotary caulking apparatus which is a kind of rotary machining apparatuses (rotary forging apparatuses) can be used. FIG. 14 shows an rotary caulking apparatus 124 disclosed in Japanese Patent Application, Publication No. 2001-241450.

The rotary caulking apparatus 124 includes a pressing die 126 having a machining portion 125 in a distal end portion (lower end portion in FIG. 14), and a holder 127 for supporting the hub main body 120 such that a central axis of this hub main body 120 is directed in an up-down direction. When the caulking portion 123 is formed by caulking and spreading the axially inner end portion of the cylindrical portion 122, the hub main body 120 is pressurized upward via the holder 127 and the pressing die 126 is subjected to swingy rotation by an actuator. That is, in a state where a central axis of the pressing die 126 is inclined with respect to the central axis of the hub main body 120 by a predetermined angle θ, the pressing die 126 is rotated about the central axis of the hub main body 120. In other words, the central axis of the pressing die 126 is subjected to whirling movement around the central axis of the hub main body 120 as it performs precessional movement along a trajectory of the central axis.

When the caulking portion 123 is formed by performing rotary caulking machining using the rotary caulking apparatus 124, a part of the pressing die 126 in the circumferential direction pressurizes an axially inner end portion of a cylindrical portion 9, and machining work with respect to the caulking portion 123 proceeds partially and continuously in the circumferential direction. Therefore, in rotary caulking machining, compared to a case of forming the caulking portion 123 by general forging pressing, a load required for machining can be reduced.

CITATION LIST

Patent Document

[Patent Document 1]
Japanese Patent Application, Publication No. 2001-241450
[Patent Document 2]
Japanese Patent Application, Publication No. 2013-91067
[Patent Document 3]
PCT International Publication No. WO2004/001247

SUMMARY OF INVENTION

Technical Problem

However, in the rotary caulking apparatus 124 described above, a significant machining reaction force is axially applied to the pressing die 126 during machining of the caulking portion 123. In contrast, Japanese Patent Application, Publication No. 2013-132678 discloses a structure of an rotary forging apparatus, Although the apparatus is not provided for forming a caulking portion in an axially inner end portion of a hub main body of a hub unit bearing, the apparatus can bear a machining reaction force applied to a pressing die (upper die) at the time of rotary forging by causing a spherical convex portion (hemispherical portion) having a partially spherical convex shape and a spherical concave portion (receiving surface) having a partially spherical concave shape to spherically engage with each other.

In the rotary forging apparatus disclosed in Japanese Patent Application, Publication No. 2013-132678, since a central axis of the pressing die is inclined with respect to a central axis of the spherical concave portion by a predetermined angle, a part of the spherical concave portion is exposed from the spherical convex portion. Accordingly, a spherical engagement portion is forcibly lubricated, and there is a possibility that lubricating oil which has flowed out (leaked out) radially outward from this spherical engagement portion may drip from the spherical concave portion and may adversely affect the ambient environment of a machining subject.

PCT International Publication No. WO2004/001247 discloses an rotary caulking apparatus in which an indentation can be prevented from being formed in an inner ring trajectory and an outer ring trajectory by rotating an outer ring during machining of a caulking portion such that a roller rotates and revolves.

An object of the present invention is to realize a structure of an rotary machining apparatus in which the influence on the ambient environment can be reduced and which is advantageous for appropriate environmental protection against swinging movement. For example, lubricating oil which has flowed out from a spherical engagement portion between a spherical convex portion and a spherical concave portion can be prevented from adversely affecting the ambient environment of a machining subject.

Solution to Problem

According to an aspect of the present invention, there is provided an rotary machining apparatus including a reference axis, a support body, a shaft-equipped spherical seat, a spherical concave seat, and a cover. The support body supports a machining subject coaxially with the reference axis. The shaft-equipped spherical seat has a machining portion which has a central axis inclined with respect to the reference axis and is formed in one axial end portion, and a spherical convex portion which is formed in an axially intermediate portion and has a partially spherical shape directed to an axially opposite end side. The spherical concave seat has an insertion hole through which a part of the shaft-equipped spherical seat on the axially opposite end side (part of the shaft-equipped spherical seat positioned on the axially opposite end side with respect to the spherical convex portion) is inserted, and a spherical concave portion which spherically engages with the spherical convex portion. The cover prevents lubricating oil for lubricating a spherical engagement portion between the spherical convex portion and the spherical concave portion from adversely affecting an ambient environment of the machining subject.

According to another aspect of the present invention, there is provided an rotary machining apparatus including a support body that has a surface intersecting a predetermined axis and supports a workpiece, a swinging body that is installed to face the surface of the support body and performs swinging movement with respect to the workpiece, and a cover that is installed to be able to rotate around the predetermined axis and relatively rotates around the predetermined axis with respect to the swinging body in response to swinging movement of the swinging body. For example, in the rotary machining apparatus, the swinging body is installed such that its axis is inclined with respect to the reference axis, and the inclined axis moves around the reference axis. Relative rotation of the cover is advantageous for appropriate environmental protection against swinging movement. For example, the position and/or the area of a cover target region changes in accordance with a change in posture of the swinging body in swinging movement. In this case as well, the changing target region is appropriately covered by the cover relatively rotating with respect to the swinging body. For example, since the cover has an asymmetrical circumferential wall around the predetermined axis, a predetermined area is appropriately protected against swinging movement of the swinging body. The cover can additionally and/or alternatively have a cover main body and a first member which is provided at least at one place in the cover main body and is pressed by the swinging body in response to swinging movement of the swinging body. In this case, a force is applied to the cover via the first member based on movement of the swinging body. As an example, the cover can be rotated by a force received from this swinging body.

According to another aspect of the present invention, a hub unit bearing which becomes a target of a method of manufacturing a hub unit bearing includes an outer ring which has a plurality of rows of outer ring trajectories on an inner circumferential surface, a hub which has a plurality of rows of inner ring trajectories on an outer circumferential surface, and a plurality of rollers which are disposed to be able to roll in each of the rows between the plurality of rows of outer ring trajectories and the plurality of rows of inner ring trajectories. The hub includes an inner ring and a hub main body. The inner ring has an inner ring trajectory of the plurality of rows of inner ring trajectories on an axially inner side provided on the outer circumferential surface. The hub main body has an inner ring trajectory of the plurality of rows of inner ring trajectories on an axially outer side which is provided on an outer circumferential surface of an axially intermediate portion directly or via a different member, a cylindrical portion which is present on a side axially inward from the inner ring trajectory on the axially outer side and into which the inner ring is externally fitted, and a caulking portion which is bent radially outward from an axially inner end portion of the cylindrical portion and restrains an axially inner end surface of the inner ring.

In the method of manufacturing a hub unit bearing according to the aspect of the present invention, the caulking portion is formed by causing a cylindrical portion provided in the axially inner end portion of the hub main body before the caulking portion is formed to be plastically deformed radially outward using the rotary machining apparatus described above.

According to another aspect of the present invention, a vehicle which becomes a target of a method of manufacturing a vehicle includes a hub unit bearing. In this method of manufacturing a vehicle, the hub unit bearing is manufactured by the method of manufacturing a hub unit bearing described above.

Advantageous Effects of Invention

According to the rotary machining apparatus of the present invention described above, the influence on the ambient environment can be reduced. For example, lubricating oil which has flowed out from the spherical engagement portion between the spherical convex portion and the spherical concave portion is prevented from adversely affecting the ambient environment of a machining subject. In addition, the rotary machining apparatus of the present invention is advantageous for appropriate environmental protection against swinging movement.

DESCRIPTION OF EMBODIMENT

[First Example of Embodiment]

FIGS. 1 to 5 show a first example of an embodiment of the present invention. An rotary machining apparatus 15 of the present example is an rotary forging apparatus, which is used in rotary caulking machining for forming a caulking portion 10 by squashing an axially inner end portion of a cylindrical portion 9 of a hub main body 7 axially outward such that the cylindrical portion 9 is plastically deformed (caulked and spread) to be widened radially outward.

Figure 13:
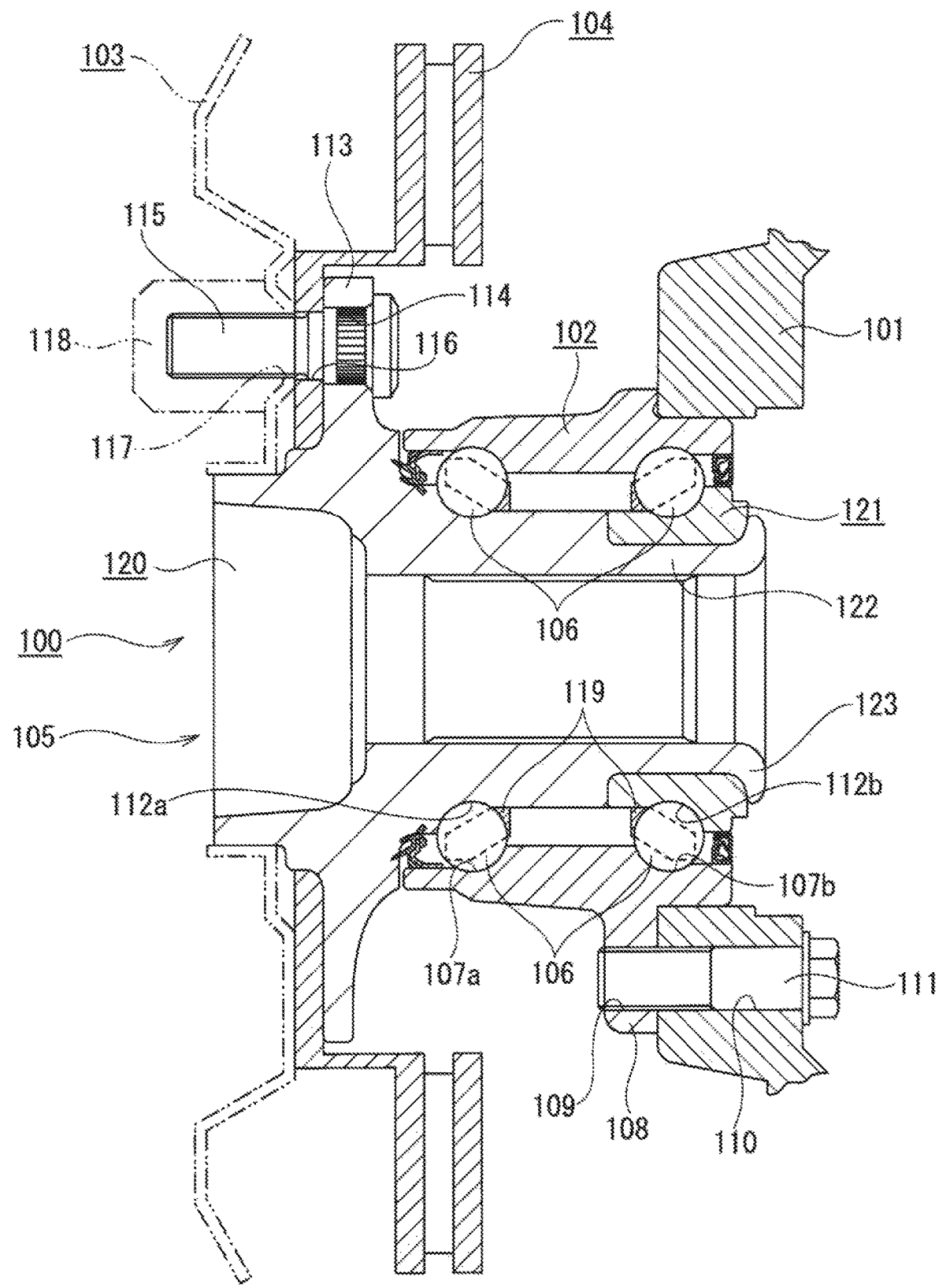
FIG. 13 is a cross-sectional view showing an example of a wheel supporting rolling bearings unit which is known in the related art.
Figure 14:
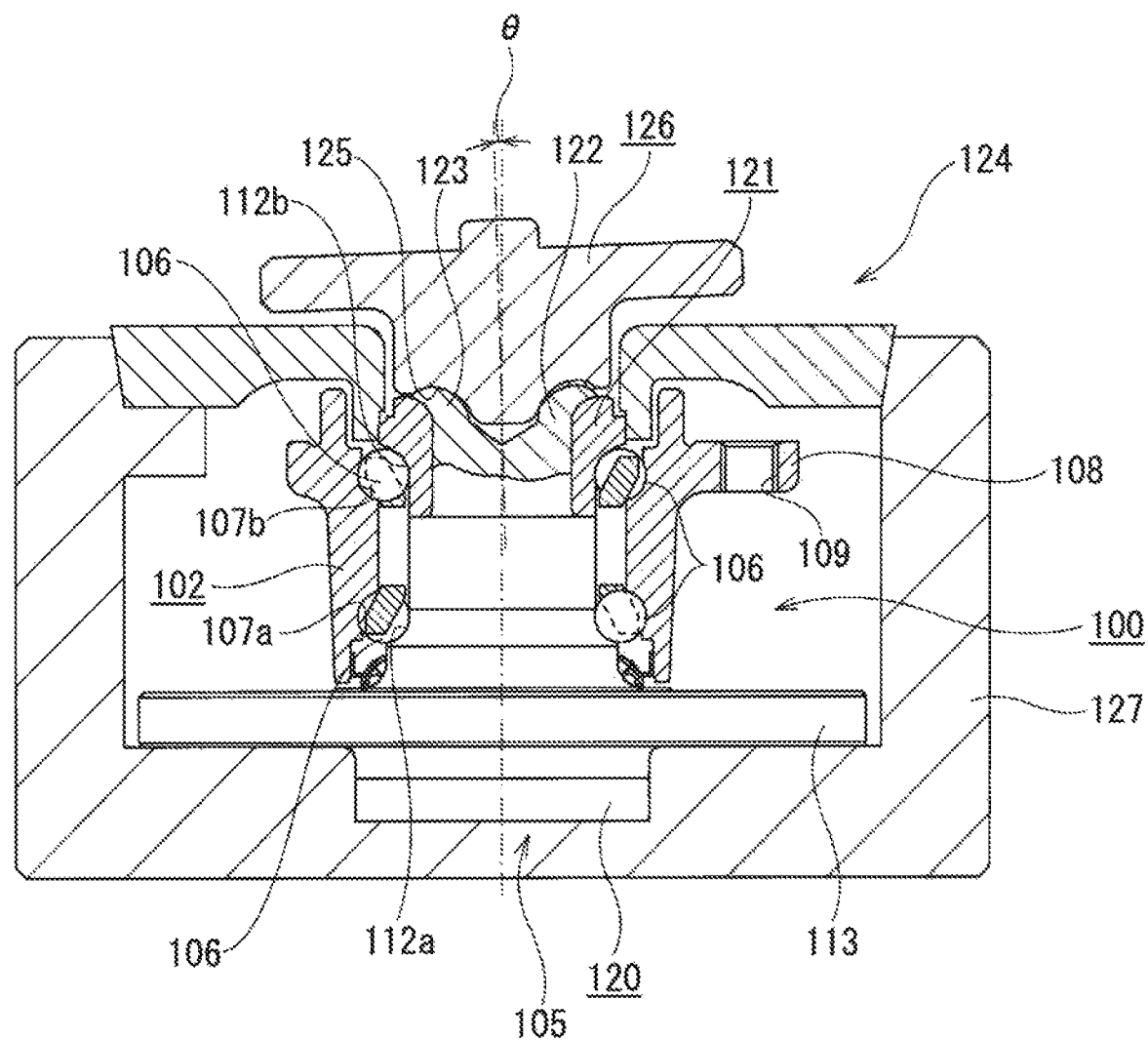
FIG. 14 is a cross-sectional view showing an example of a structure of an rotary machining apparatus (rotary forging apparatus) in the related art.

In this example, a hub 3 of a hub unit bearing 1 (machining subject) is constituted by causing a pair of inner rings 8a and 8b to be externally fitted to an outer circumferential surface of an axially intermediate portion of the hub main body 7 and restraining an axially inner end surface of an inner ring 8b on an axially inner side using the caulking portion 10 obtained by causing the axially inner end portion of the cylindrical portion 9 provided in an axially inner end portion of the hub main body 7 to be plastically deformed radially outward. However, as in a hub unit bearing 100 shown in FIG. 13, the hub unit bearing 1 which becomes a target in the present example can be constituted of a hub main body having an outer ring trajectory on an axially outer side on the outer circumferential surface of the axially intermediate portion, and one inner ring.

In addition, in the hub unit bearing 1, a conical roller is used as a roller 6. However, as in the hub unit bearing 100 shown 13, a ball can be used.

Regarding the hub unit bearing 1, the axially inner side indicates a side in the middle of a vehicle in a width direction in a state where the hub unit bearing 1 is assembled in a suspension system. In contrast, an outer side of the vehicle in the width direction in a state where the hub unit hearing 1 is assembled in the suspension system will be referred to as the axially outer side.

An rotary forging apparatus 15 of the present example is placed on a floor surface in a factory or the like and includes a frame 16 which is not displaced while running the rotary forging apparatus 15, a support body (support jig) 17, a shaft-equipped spherical seat (swinging body) 18, a spherical concave seat 19, a driving mechanism 38, an outer ring rotation mechanism 43, an oil pan 20, and a cover 21. In addition, the rotary forging apparatus 15 has a reference axis C which becomes a reference for machining. In this example, the reference axis C is directed in an up-down direction and is disposed in a middle portion of the rotary forging apparatus 15.

The support body 17 supports the hub unit bearing 1 (workpiece, a machining subject) such that a central axis of this hub unit bearing 1 and the reference axis C become coaxial with each other, while an axially outer end portion of the hub unit bearing 1 is directed downward and the axially inner end portion of the same is directed upward. That is, on an upper surface, the support body 17 has a support recess portion 22 which can engage with (be fitted into) the axially outer end portion of the hub main body 7 without radial wobbling. Such a support body 17 is supported by an upper end portion of a lifting/lowering table 23 mounted to be able to be lifted and lowered along the reference axis C in a lower portion inside the frame 16.

Figure 1:
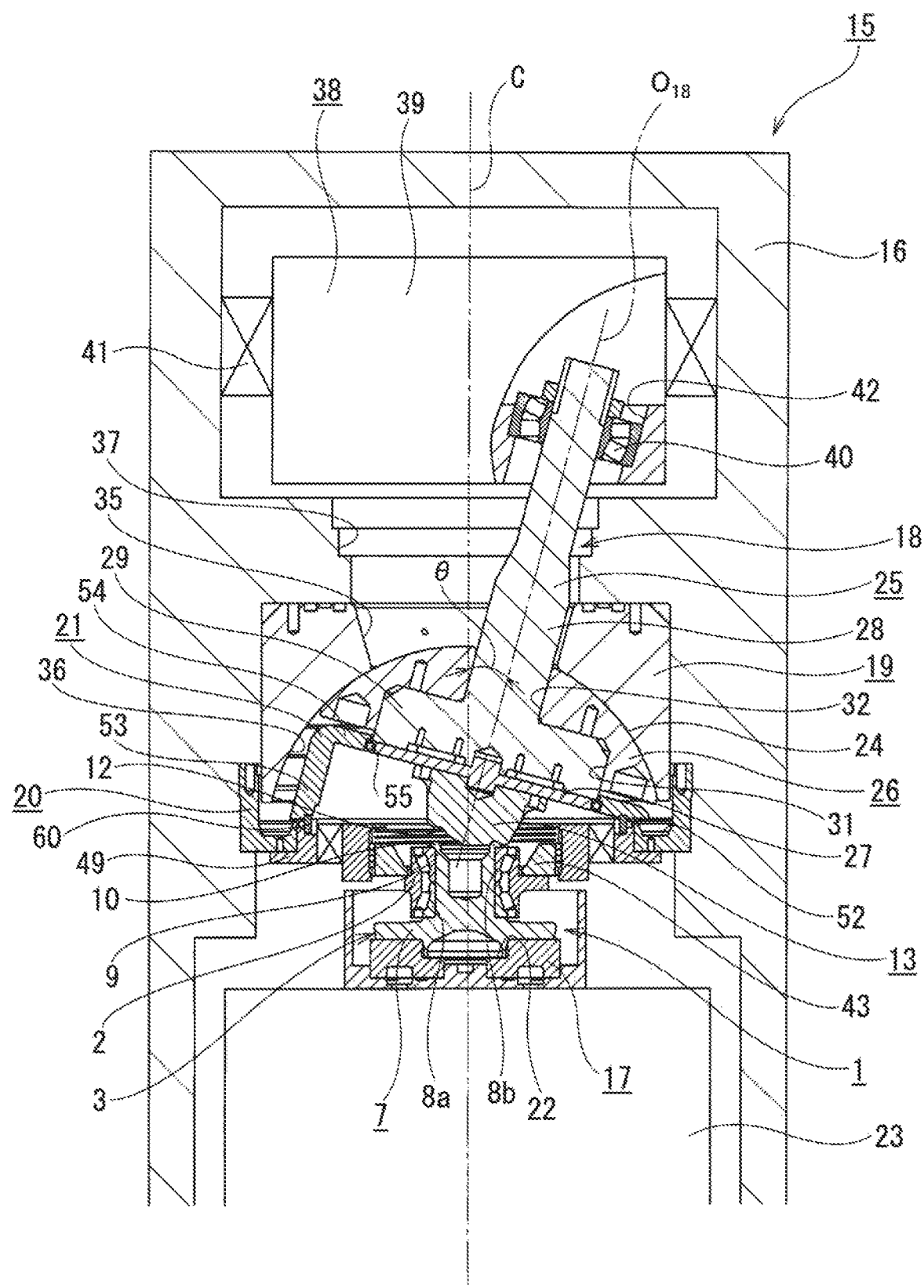
FIG. 1 is a schematic cross-sectional view showing an rotary machining apparatus (rotary forging apparatus) according to a first example of an embodiment of the present invention.
Figure 2:
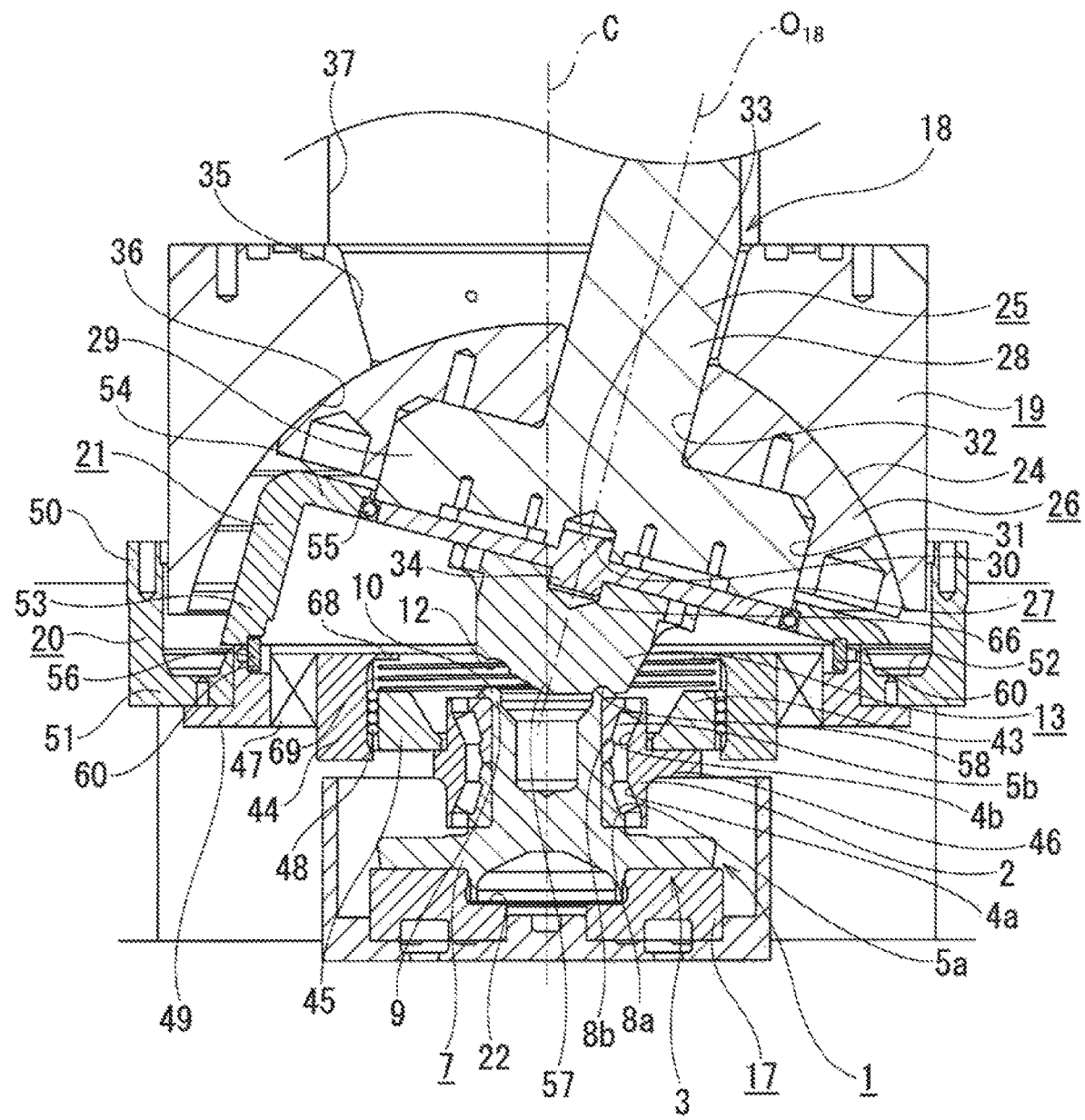
FIG. 2 is an enlarged cross-sectional view of a main portion in FIG. 1.

The shaft-equipped spherical seat 18 has a central axis $O_{18}$ inclined with respect to the reference axis C and has a machining portion 12 which is formed in one axial end portion (lower end portion in FIGS. 1 and 2), and a spherical convex portion 24 which has a partially spherical shape, is formed in the axially intermediate portion, and is directed to an axially opposite end side (upper side in FIGS. 1 and 2). The shaft-equipped spherical seat (swinging body) 18 is installed to face a surface of the support body 17 intersecting a predetermined axis and performs swinging movement with respect to the workpiece (machining subject) 1. The predetermined axis is the reference axis C and/or a central axis (rotation axis) of the cover 21, for example.

Regarding the shaft-equipped spherical seat 18 as well as a shaft main body 25, a spherical convex seat, a base plate 27, and a pressing die 13 constituting the shaft-equipped spherical seat 18, one axial end side indicates a side of a distal end portion in which the machining portion 12 is formed (obliquely lower left side in FIGS. 1 and 2), and the axially opposite end side indicates a side opposite to the distal end portion in which the machining portion 12 is formed (obliquely upper right side in FIGS. 1 and 2).

An inclination angle $\theta$ of the central axis $O_{18}$ of the shaft-equipped spherical seat 18 with respect to the reference axis C is preferably within a range of 15 degrees to 45 degrees, is more preferably within a range of 15 degrees to 30 degrees, and is still more preferably within a range of 15 degrees to 18 degrees. For example, the inclination angle $\theta$ is 5, 10, 12, 14, 16, 18, 20, 25, 30, 35, 40, or 45 degrees. In this example, the inclination angle $\theta$ is set to 1.5 degrees. When the inclination angle $\theta$ is set to 15 degrees or greater, a force in a direction in which the cylindrical portion 9 is squashed axially outward and a force in a direction in which the cylindrical portion 9 is widened radially outward can be adjusted to an appropriate magnitude, and favorable surface roughness of a part on the outer circumferential surface of the cylindrical portion 9 which abuts (fitted to) an inner circumferential surface of the inner ring 8b can be achieved, so that durability of the hub unit bearing 1 can be improved. In addition, if the inclination angle $\theta$ is set to 30 degrees or smaller, when the caulking portion 10 is formed by rotary caulking machining, the amount of wear of this caulking portion 10 can be limited to be small, so that durability of the hub unit bearing 1 can be improved. The inclination angle $\theta$ can be set to less than 15 degrees or greater than 45 degrees. When the hub unit bearing 1 is manufactured using the rotary forging apparatus of the present invention, it is preferable that the inclination angle $\theta$ be within a range of 15 degrees to 18 degrees with regard to the structure.

In this example, the shaft-equipped spherical seat swinging body) 18 is constituted by combining the shaft main body 25, a spherical convex seat 26, the base plate 27, and a pressing die (machining tool) 13.

The shaft main body 25 includes a shaft portion 28, a flange portion 29 protruding radially outward from the outer circumferential surface of the one axial end portion of the shaft portion 28, and a first positioning recess portion 30 formed in the middle portion on one axial end surface.

The spherical convex seat 26 includes the spherical convex portion 24 formed on a side surface on the axially opposite end side, a fitting recess portion 31 formed on a side surface on the one axial end side, and a penetration hole 32. The flange portion 29 of the shaft main body 25 can be internally fitted into the fitting recess portion 31 without radial wobbling. The penetration hole 32 is formed to axially penetrate a central portion of the spherical convex seat 26, and the axially intermediate portion (part adjacent to the axially opposite end side of a part in which the flange portion 29 is formed) of the shaft portion 28 of the shaft main body 25 can be inserted therethrough without radial wobbling.

The base plate 27 has a first positioning bulging portion 33 which is formed on the side surface on the axially opposite end side and can be fitted into the first positioning recess portion 30 of the shaft main body 25 without radial wobbling, and a second positioning bulging portion 34 which is formed on the side surface on the one axial end side.

The pressing die (machining tool, swinging body) 13 has the machining portion 12 which is formed in the one axial end portion, and a second positioning recess portion 66 which is formed on the side surface on the axially opposite end side and can be fitted into the second positioning bulging portion 34 of the base plate 27 without radial wobbling. That is, the machining portion 12 is constituted by forming a conical protruding portion 57 in the middle portion on the side surface of the pressing die 13 on the one axial end side and forming a recessed groove 58 having an arc-shaped cross section around this protruding portion 57 such that the whole circumference of the protruding portion 57 is surrounded. The pressing die (machining tool, swinging body) 13 is installed to face the surface of the support body 17 intersecting the predetermined axis and performs swinging movement with respect to the workpiece (machining subject) 1.

The shaft main body 25 and the spherical convex seat 26 are combined by causing the axially intermediate portion of the shaft portion 28 to be inserted through or press-fitted into the penetration hole 32 without radial wobbling and causing the flange portion 29 to be internally fitted into the fitting recess portion 31 without radial wobbling. In addition, the base plate 27 and the pressing die (machining tool) 13 are coupled and fixed to each other by causing the second positioning bulging portion 34 of the base plate 27 to be internally fitted into the second positioning recess portion 66 of the pressing die 13 without radial wobbling and screwing a bolt inserted through a circular hole formed in the pressing die 13 into a screw hole formed in the base plate 27. In this example, the shaft-equipped spherical seat 18 is constituted of an assembly (main body portion) of the shaft main body 25 and the spherical convex seat 26 and an assembly of the base plate 27 and the pressing die 13 by performing uneven engagement between the first positioning recess portion 30 and the first positioning bulging portion 33 such that they are coupled to each other using a coupling member such as a bolt.

Figure 5:
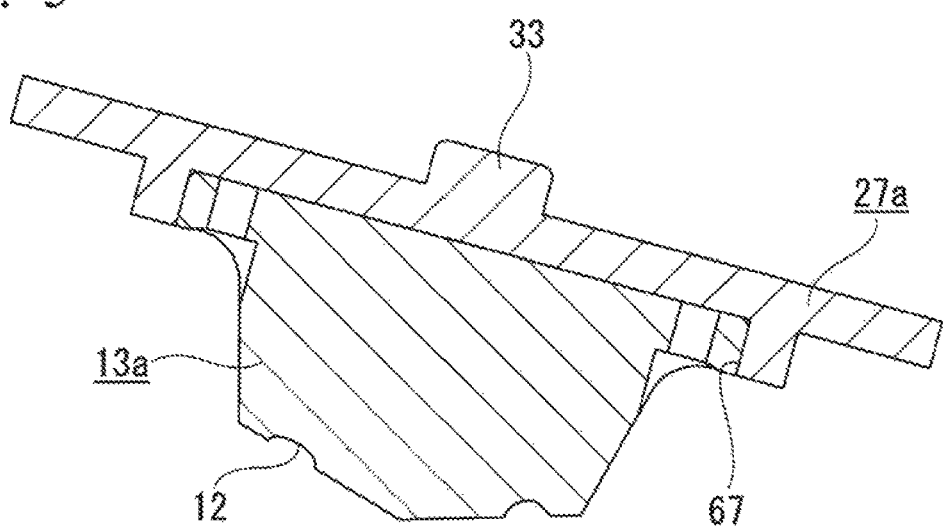
FIG. 5 is a cross-sectional view showing another example of a coupling structure between a base plate and a pressing die.

However, as shown in FIG. 5, a base plate 27a and a pressing die (machining tool) 13a may be coupled and fixed to each other by causing a base end portion of the pressing die 13a (axially opposite end portion, the upper end portion in FIG. 5) to be internally fitted to a holding recess portion 67 formed on the side surface of the base plate 27a on the one axial end side without wobbling and screwing a bolt inserted through a circular hole formed in the pressing die 13a into a screw hole formed in the base plate 27a. In addition, a method of coupling and fixing the shaft main body 25, the spherical convex seat 26, the base plates 27 and 27a, and the pressing dies 13 and 13a is not limited to a method of using a bolt. For example, they can be coupled and fixed by performing press-fitting, using a snap ring, or the like. In addition, a part of the shaft main body 25, the spherical convex seat 26, the base plate 27, and the pressing die 13 can be integrally formed, or the shaft-equipped spherical seat 18 in its entirety can be integrally formed.

The spherical concave seat 19 includes an insertion hole 35 through which the axially intermediate portion of the shaft-equipped spherical seat 18 (part of the shaft portion 28 of the shaft main body 25 protruding from the spherical convex portion 24 of the spherical convex seat 26 to the axially opposite end side) is inserted, and a spherical concave portion 36 which has a partially spherical shape spherically engaging with the spherical convex portion 24 of the shaft-equipped spherical seat 18. In this example, the spherical concave seat 19 is supported by and fixed to an intermediate portion in the up-down direction inside the frame 16.

In this example, the spherical convex portion 24 of the shaft-equipped spherical seat 18 and the spherical concave portion 36 of the spherical concave seat 19 spherically engage with each other, so that the shaft-equipped spherical seat 18 is allowed to perform swinging movement (oscillating rotation, revolution) about the reference axis C, and the shaft-equipped spherical seat 18 is allowed to change posture (rotation movement, rotation) about its central axis $O_{18}$. In addition, the shaft-equipped spherical seat 18 can bear a machining reaction force applied thereto when rotary forging is performed. While running the rotary forging apparatus 15, that is, while the shaft-equipped spherical seat 18 performs swinging movement about the reference axis C due to the driving mechanism 38 (which will be described below), a spherical engagement portion between the spherical convex portion 24 and the spherical concave portion 36 is forcibly lubricated by lubricating oil discharged through a plurality of discharge ports formed in the spherical concave portion 36.

In this example, the insertion hole 35 of the spherical concave seat 19 is a tapered hole of which the inner diameter dimension increases as it goes upward. In addition, a part of the frame 16 adjacent to an upper side of the insertion hole 35 of the spherical concave seat 19, that is, a part having the axially intermediate portion of the shaft-equipped spherical seat 18 inserted therethrough is provided with a stepped hole 37 of which the inner diameter dimension increases in stages as it goes upward. The inner diameter dimensions of the insertion hole 35 and the stepped hole 37 are restricted such that the inner circumferential surfaces of the insertion hole 35 and the stepped hole 37 and the outer circumferential surface of the shaft-equipped spherical seat 18 do not interfere with each other when the shaft-equipped spherical seat 18 performs swinging movement about the reference axis C.

In the present example, a reason for providing a part of the frame 16 adjacent to the upper side of the insertion hole 35 of the spherical concave seat 19 with the stepped hole 37 is that machining is facilitated. When the present invention is performed, a part of the frame 16 adjacent to the upper side of the insertion hole 35 of the spherical concave seat 19 can be provided with a tapered hole of which the inner diameter dimension increases as it goes upward.

The driving mechanism 38 is provided to apply a driving force for this shaft-equipped spherical seat 18 to perform swingy rotation about the reference axis C with respect to the axially opposite end portion of the shaft-equipped spherical seat 18. The driving mechanism 38 is supported by and fixed to the upper end portion inside the frame 16 and is interlocked with the axially opposite end portion of the shaft portion 28 of the shaft main body 25 of the shaft-equipped spherical seat 18 protruding upward from the stepped hole 37 such that a driving force is applied thereto.

The driving mechanism 38 includes a rotor 39 and a bearing 40. The rotor 39 is supported by the upper end portion inside the frame 16 to be able to rotate only about the reference axis C via a bearing device 41. In addition, at one position in a radially intermediate portion in a circumferential direction, the rotor 39 has a holding hole 42 inclined in a direction directed radially outward as it goes upward. An inclination angle of the central axis of the holding hole 42 with respect to the reference axis C is the same as the inclination angle θ of the central axis $O_{18}$ of the shaft-equipped spherical seat 18 with respect to the reference axis C. In addition, an output portion of a motor (not shown) for rotatively driving this rotor 39 about the reference axis C is connected to the rotor 39 directly or via a speed reducer.

The bearing 40 is provided between the inner circumferential surface of the holding hole 42 and the outer circumferential surface of the axially opposite end portion of the shaft-equipped spherical seat 18 and rotatably supports the axially opposite end portion of the shaft-equipped spherical seat 18 with respect to the holding hole 42. In this example, an automatic aligning bearing is used as the bearing 40. Alternatively, a rolling bearing such as a deep groove ball bearing or an angular ball bearing can be used, as long as it can bear a radial load and an axial load.

The outer ring rotation mechanism 43 is provided to cause the roller 6 to rotate and revolve by rotatively driving an outer ring 2 of the hub unit bearing 1 and to prevent an indentation from being formed in outer ring trajectories 4a and 4b included in the outer ring 2 and inner ring trajectories 5a and 5b included in the hub 3 when the caulking portion 10 is formed. The outer ring rotation mechanism 43 includes an electric motor (not shown), a driving ring 44 which is rotatively driven by this electric motor, and a driving jig 45 which is supported to be able to be slightly lifted and lowered with respect to this driving ring 44 and to be able to rotate synchronously with the driving ring 44. Specifically, in the shown example, the driving ring 44 and the driving jig 45 are combined via a ball spline 48. An inward flange portion 68 protruding radially inward is provided in the upper end portion of the driving ring 44, and a torsion coil spring 69 is sandwiched between a lower side surface of this inward flange portion 68 and an upper end surface of the driving jig 45. Due to such a constitution, the lower end portion of the driving jig 45 can be coupled to a coupling flange 46 of the outer ring 2 by supporting the driving jig 45 to be able to be displaced in the up-down direction with respect to the driving ring 44. The outer ring rotation mechanism 43 is constituted to be able to rotatively drive the outer ring 2 by rotatively driving the driving jig 45 engaging with the coupling flange 46 of the outer ring 2 via the driving ring 44 using an electric motor. The driving ring 44 is supported to be able to rotate with respect to the frame 16 in order from a radially inner side via a radial bearing 47, an entirely annular guide ring 49 having an L-shaped cross section, and the oil pan 20 around the driving ring 44. However, the outer ring rotation mechanism 43 is not limited to the constitution described above. Various constitutions can be employed, as long as the roller 6 can rotate and revolve by rotatively driving the outer ring 2.

The oil pan 20 is constituted in a substantially L-shaped cross section and includes a cylindrical portion 50 which is supported and fixed around the one axial end portion (lower end portion) of the spherical concave seat 19, and a circular ring portion 51 which is bent radially inward from the lower end portion of this cylindrical portion 50. The circular ring portion 51 has an annular recess portion 52 which faces an outer circumferential edge of the spherical concave portion 36 of the spherical concave seat 19 throughout the whole circumference on the upper surface. Therefore, the spherical engagement portion between the spherical convex portion 24 of the shaft-equipped spherical seat 18 and the spherical concave portion 36 of the spherical concave seat 19 is lubricated, and a greater part of lubricating oil which has flowed out (leaked out) from an outer circumferential edge portion of this spherical engagement portion moves downward along the spherical concave portion 36 and drips into the annular recess portion 52 from the outer circumferential edge portion of this spherical concave portion 36. The lubricating oil which has dripped into the annular recess portion 52 is collected through an oil passage hole (not shown) formed in the oil pan 20 and is supplied again from a nozzle to the spherical engagement portion between the spherical convex portion 24 and the spherical concave portion 36 via a lubricating oil flow channel.

Figure 3A:
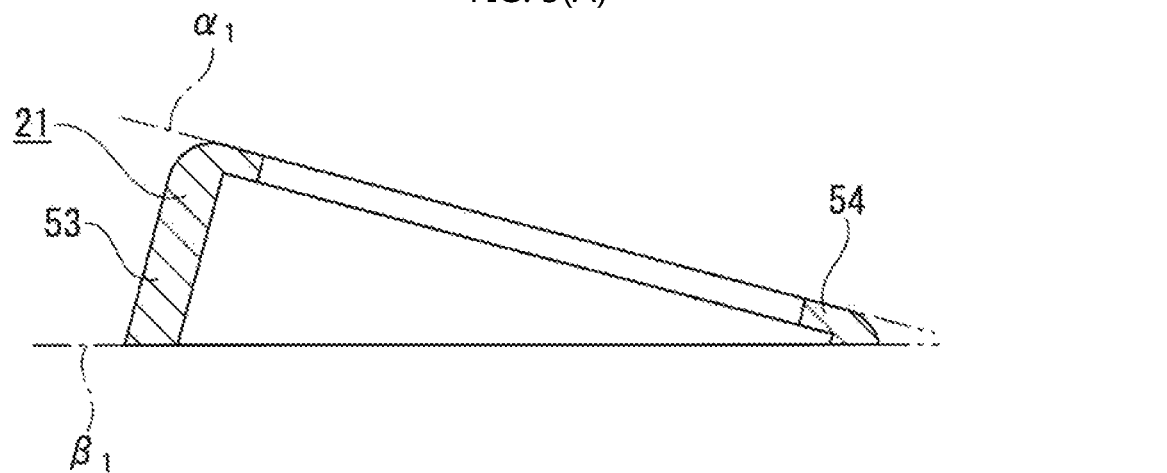
FIG. 3(A) and FIG. 3(B) are cross-sectional views for describing a method of manufacturing a cover.
Figure 3B:
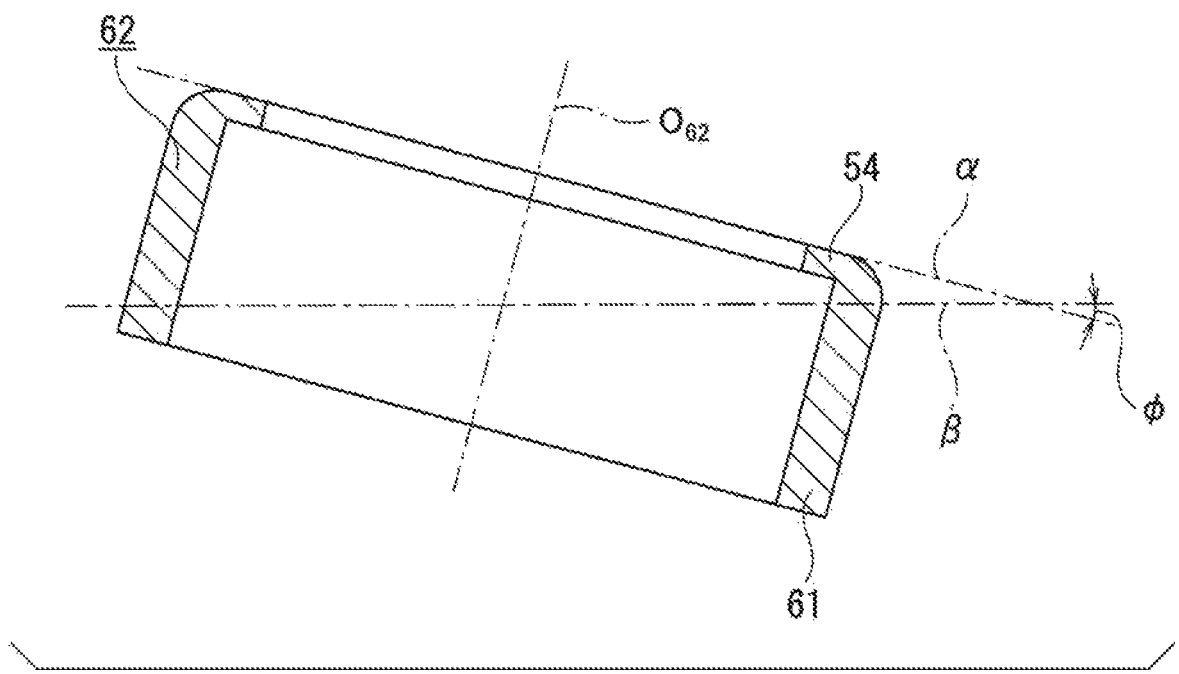

For example, the cover 21 can be formed of a rubber, a synthetic resin, a light alloy such as an aluminum alloy a ferrous metal such as a carbon steel, or other materials. The cover 21 includes a covering portion (cover main body) 53 which has an obliquely cut tubular shape (bamboo-cut shape) realized by obliquely cutting a cylinder, and an inward flange portion 54 which is bent radially inward from the upper end portion of this covering portion 53. The covering portion (cover main body) 53 has an asymmetrical circumferential wall around the predetermined axis. For example, the axial length (height of the wall) of the circumferential wall varies depending on the position in the circumferential direction around the predetermined axis. The covering portion (cover main body) 53 additionally and/or alternatively has a circumferential wall having an axial end surface installed to be parallel to a first imaginary plane perpendicular to the predetermined axis, and an axial end surface installed to be parallel to a second imaginary plane inclined with respect to the predetermined axis. When such a cover 21 is made, first, as shown in FIG. 3(B), a tubular member 62 including a cylindrical portion 61 and the inward flange portion 54 bent radially inward from the upper end portion of this cylindrical portion 61 is made. Next, the cover 21 is obtained by cutting the cylindrical portion 61 along a second imaginary plane β inclined with respect to a first imaginary plane α orthogonal to a central axis $O_{62}$ of the tubular member 62. An inclination angle φ of the second imaginary plane β with respect to the first imaginary plane α is set to be the same as the inclination angle θ (refer to FIG. 1) of the central axis $O_{18}$ of the shaft-equipped spherical seat 18 with respect to the reference axis C. In a state of being attached to the rotary forging apparatus 15, the central axis $O_{62}$ of the tubular member 62 (a central axis $O_{21}$ of the cover 21) is disposed coaxially with the central axis $O_{18}$ of the shaft-equipped spherical seat 18. Therefore, in a state of being attached to the rotary forging apparatus 15, an axially opposite side surface of the inward flange portion 54 is present in a first imaginary plane $α_1$ orthogonal to the central axis $O_{18}$ of the shaft-equipped spherical seat 18, and the lower side surface of the covering portion 53 is present in a second imaginary plane $β_1$ orthogonal to the reference axis C.

The cover 21 rotatably supports a radially inner end portion of the inward flange portion 54 on the outer circumferential surface of the base plate 27 of the shaft-equipped spherical seat 18 via rolling bearings 55 which are radial rolling bearings such as four-point contact-type ball bearings. In addition, a lower end surface of the covering portion 53 of the cover 21 is disposed around the hub unit bearing 1 (machining subject) via a plurality of radial rolling bearings 60 and is placed on the upper surface of the guide ring 49 supported by the frame 16. That is, the inner rings of the plurality of radial rolling bearings 60 are supported by the upper end portion of the guide ring 49 at equal intervals in the circumferential direction about the reference axis C in a state where the central axes thereof are disposed in the radial direction about the reference axis C. Then, the lower end surface of the covering portion 53 of the cover 21 is placed on the upper surface of the outer rings of the plurality of radial rolling bearings 60 (upper part on the outer circumferential surface of the outer rings). Accordingly, the upper surface of the guide ring 49 and the one axial end portion of the cover 21 can relatively rotate during machining of the caulking portion 10.

When the caulking portion 10 is formed in the axially inner end portion of the hub main body 7 using the rotary forging apparatus 15 of the present example, first, in a state where the hub main body 7 before the caulking portion 10 is formed and other components constituting the hub unit bearing 1 are assembled, the hub main body 7 is supported by the support body 17 without radial wobbling such that the central axis of the hub main body 7 and the reference axis C become coaxial with each other, while the axially outer end portion of the hub unit bearing 1 is directed downward and the axially inner end portion of the same is directed upward.

Next, a part of the recessed groove 58 in the circumferential direction in the machining portion 12 of the shaft-equipped spherical seat 18 is pressed to a part of the axially inner end portion of the cylindrical portion 9 in the circumferential direction provided in the axially inner end portion of the hub main body 7 by lifting the lifting/lowering table 23. Furthermore, the driving jig 45 engages with the coupling flange 46 of the outer ring 2.

Next, the shaft-equipped spherical seat 18 is subjected to swingy rotation about the reference axis C based on rotation of the rotor 39 about the reference axis C. At this time, the shaft-equipped spherical seat 18 rotates (rotates on its axis) about its central axis $O_{18}$ based on a frictional force acting on a contact portion between the recessed groove 58 of a machining portion 12a and the axially inner end portion of the cylindrical portion 9. In addition, at this time, the spherical engagement portion between the spherical convex portion 24 and the spherical concave portion 36 is forcibly lubricated by lubricating oil discharged through the plurality of discharge ports formed in the spherical concave portion 36. The shaft-equipped spherical seat 18 is subjected to swingy rotation, such that loads directed to the axially outer side and the radially outer side are applied to parts of the cylindrical portion 9 in the circumferential direction to cause the parts to which the loads are applied to continuously change in the circumferential direction. Then, the caulking portion 10 is formed by gradually causing the axially inner end portion of the cylindrical portion 9 to be plastically deformed. Particularly, if the oscillation angle (the inclination angle θ) of the shaft-equipped spherical seat 18 when the caulking portion 10 is formed by performing rotary forging is set within a range of 15 degrees to 30 degrees, the maximum machining load when performing this rotary forging can be limited to be low.

In the rotary forging apparatus 15 of the present example, during machining of the caulking portion 10, the axially inner end portion of the hub unit bearing 1, the outer ring rotation mechanism 43 present around this hub unit bearing 1, the radial bearing 47, and the upper end portion of the guide ring 49 are covered with the cover 21. Therefore, even when the spherical engagement portion between the spherical convex portion 24 and the spherical concave portion 36 is forcibly lubricated and a part of lubricating oil which has flowed out (leaked out) from the outer circumferential edge portion of this spherical engagement portion drips, the cover 21 can prevent this lubricating oil from adhering to the axially inner end portion of the hub unit bearing 1, the outer ring rotation mechanism 43, the radial bearing 47, and the upper end portion of the guide ring 49. That is, the lubricating oil can be prevented from adversely affecting the ambient environment of the hub unit bearing 1.

Lubricating oil which has dripped from the spherical concave portion 36 is guided into the annular recess portion 52 of the oil pan 20 along the outer circumferential surface of the cover 21 and is collected through the oil passage hole. In the rotary forging apparatus 15, the swinging bodies (the shaft-equipped spherical seat 18 and the pressing die 13 (13a)) are installed such that their axes are inclined with respect to the reference axis, and the inclined axes move around the reference axis. Relative rotation of the cover 21 is advantageous for appropriate environmental protection against swinging movement. For example, the position and/or the area of a cover target region changes in accordance with a change in posture of the shaft-equipped spherical seat (swinging body) 18 in swinging movement. In this case as well, the changing target region is appropriately covered by the cover 21 relatively rotating with respect to the shaft-equipped spherical seat (swinging body) 18. Since the cover 21 has the asymmetrical circumferential wall 53 around the predetermined axis, a predetermined area is appropriately protected against swinging movement of the shaft-equipped spherical seat (swinging body) 18.

In addition, in this example, the radially inner end portion of the inward flange portion 54 of the cover 21 is rotatably supported by the outer circumferential surface of the base plate 27 of the shaft-equipped spherical seat 18 via the rolling bearings 55, and the one axial end portion of the cover 21 is rotatably placed on the upper surface of the guide ring 49 via the plurality of radial rolling bearings 60. Accordingly, the cover 21 can be smoothly rotated in accordance with swingy rotation of the shaft-equipped spherical seat 18. That is, during machining of the caulking portion 10, at all times, a part of the covering portion 53 of the cover 21 having a small axial dimension can be positioned in a part in which the distance between the outer circumferential surface of the base plate 27 of the shaft-equipped spherical seat 18 and the upper surface of the guide ring 49 is short.

Figure 4A:
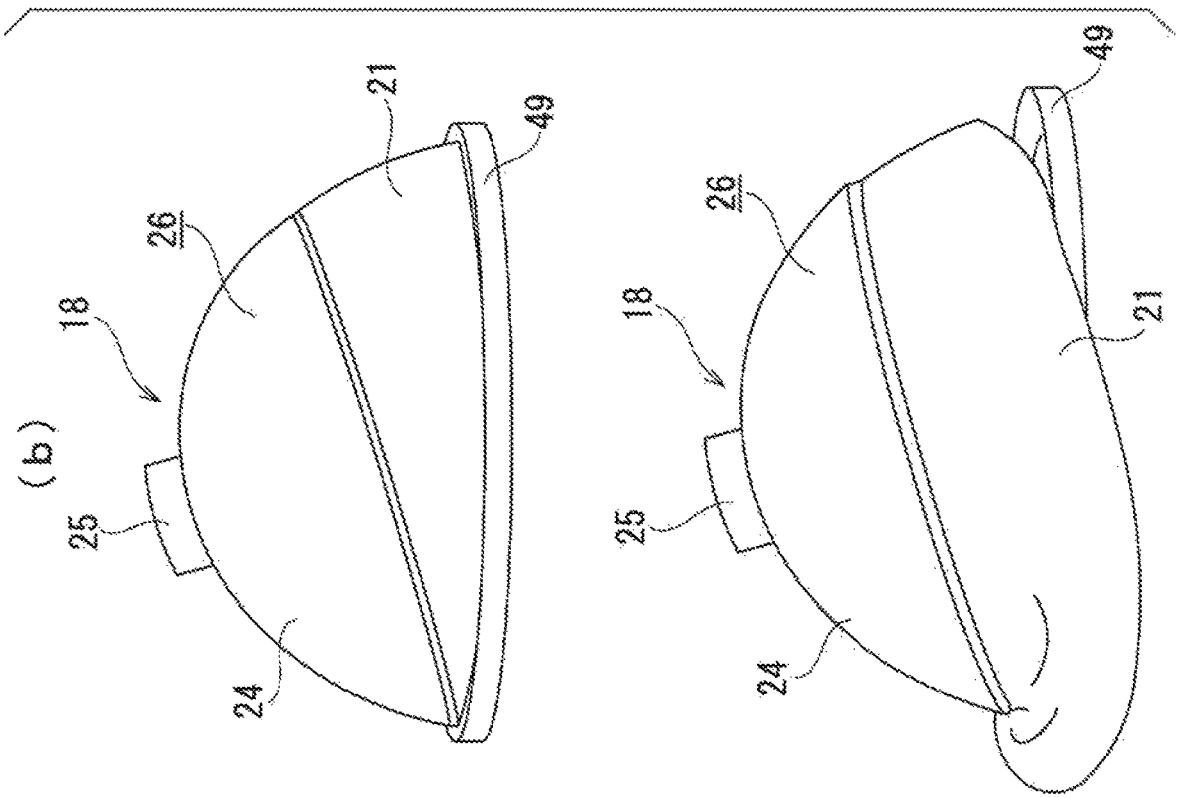
FIG. 4(A) and FIG. 4(B) are views showing results of simulation performed to check effects of the present invention.

That is, as in the present example, on an assumption of a case where the cover 21 can rotate with respect to the shaft-equipped spherical seat 18 and the guide ring 49, as a simulation result of a case where the frictional coefficient among the cover 21, the shaft-equipped spherical seat 18, and the guide ring 49 is set to zero and the shaft-equipped spherical seat 18 is subjected to swingy rotation about the reference axis C, as shown in (a) of FIG. 4(A)→(b) of FIG. 4(A), the cover 21 smoothly rotates without being damaged.

Figure 4B:
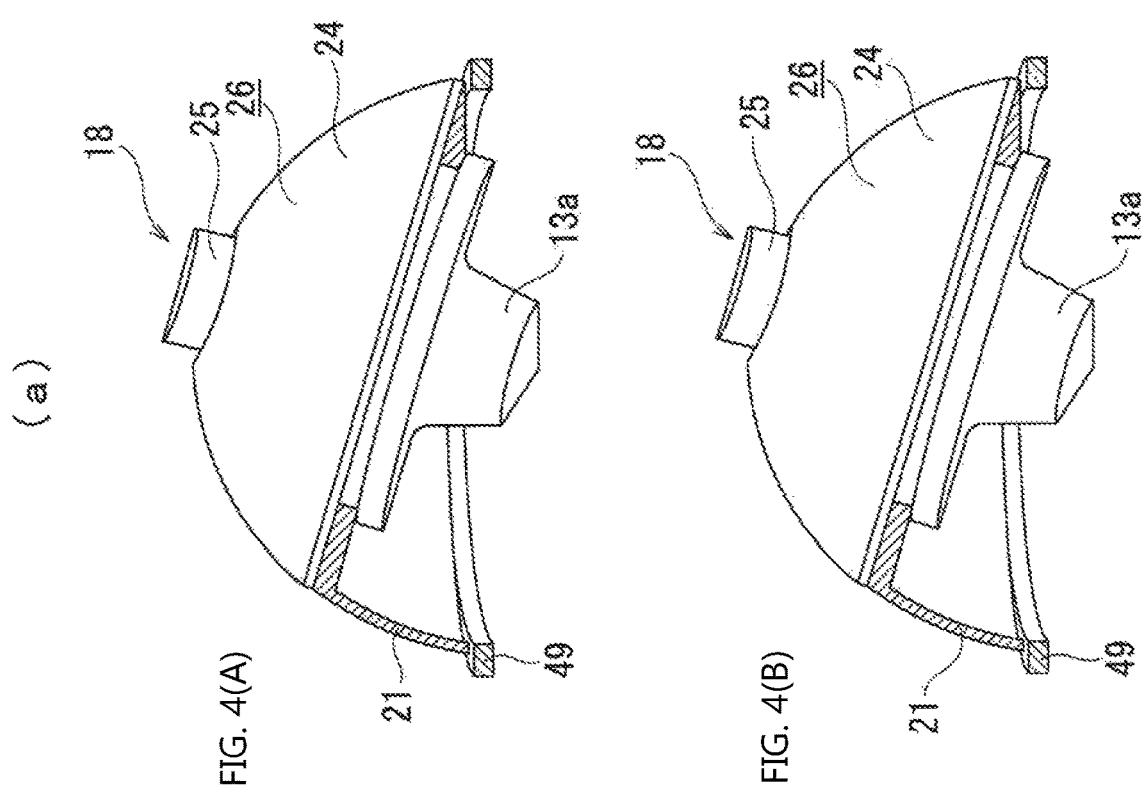

Meanwhile, on an assumption of a case where the cover 21 and the shaft-equipped spherical seat 18 are lubricated by lubricating oil and the one axial end portion of the cover 21 is directly brought into sliding contact with the upper surface of the guide ring 49, when a simulation in which the shaft-equipped spherical seat 18 is subjected to swingy rotation about the reference axis C is performed while the frictional coefficient between the cover 21 and the shaft-equipped spherical seat 18 is set to 0.2 and the frictional coefficient between the cover 21 and the guide ring 49 is set to 0.4, as shown in (a) of FIG. 4(B)→(b) of FIG. 4(B), the cover 1 is deformed or damaged.

In this example, a case where the caulking portion 10 is formed by causing the axially inner end portion of the hub main body 7 of the hub unit bearing 1 to be plastically deformed radially outward using the rotary forging apparatus 15 has been described. However, the rotary machining apparatus of the present invention is not limited thereto and can be used for rotary forging machining of various machining subjects such as hub unit bearings having a face spline in the axially inner end portion of a hub, bevel gears, and ring-shaped members having a flange portion in an axial end portion. The rotary machining apparatus of the present invention can also be applied to apparatuses performing machining other than forging.

[Second Example of Embodiment]

Figure 6:
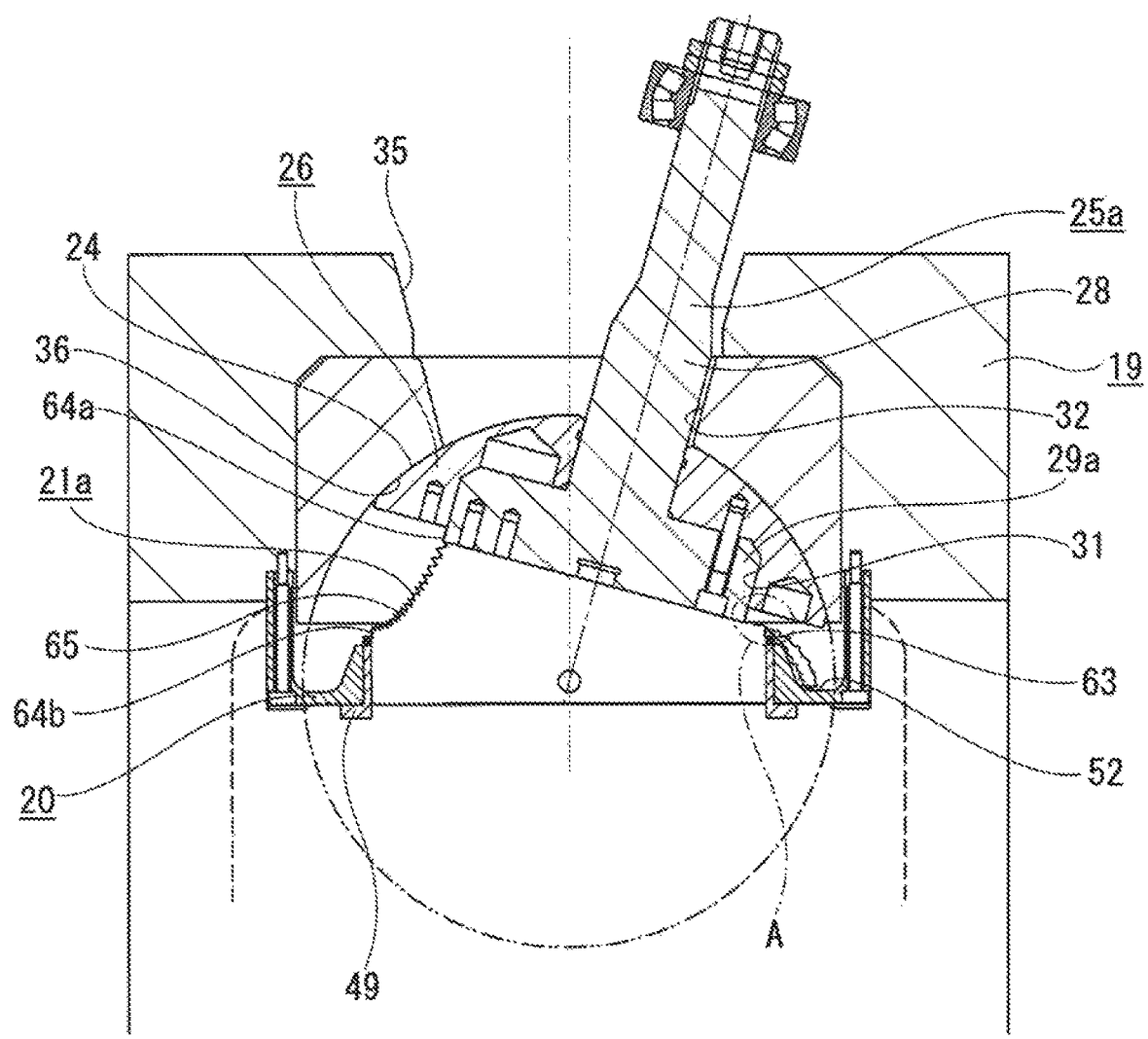
FIG. 6 is an enlarged cross-sectional view of a main portion showing an rotary machining apparatus (rotary forging apparatus) according to a second example of the embodiment of the present invention.
Figure 7:
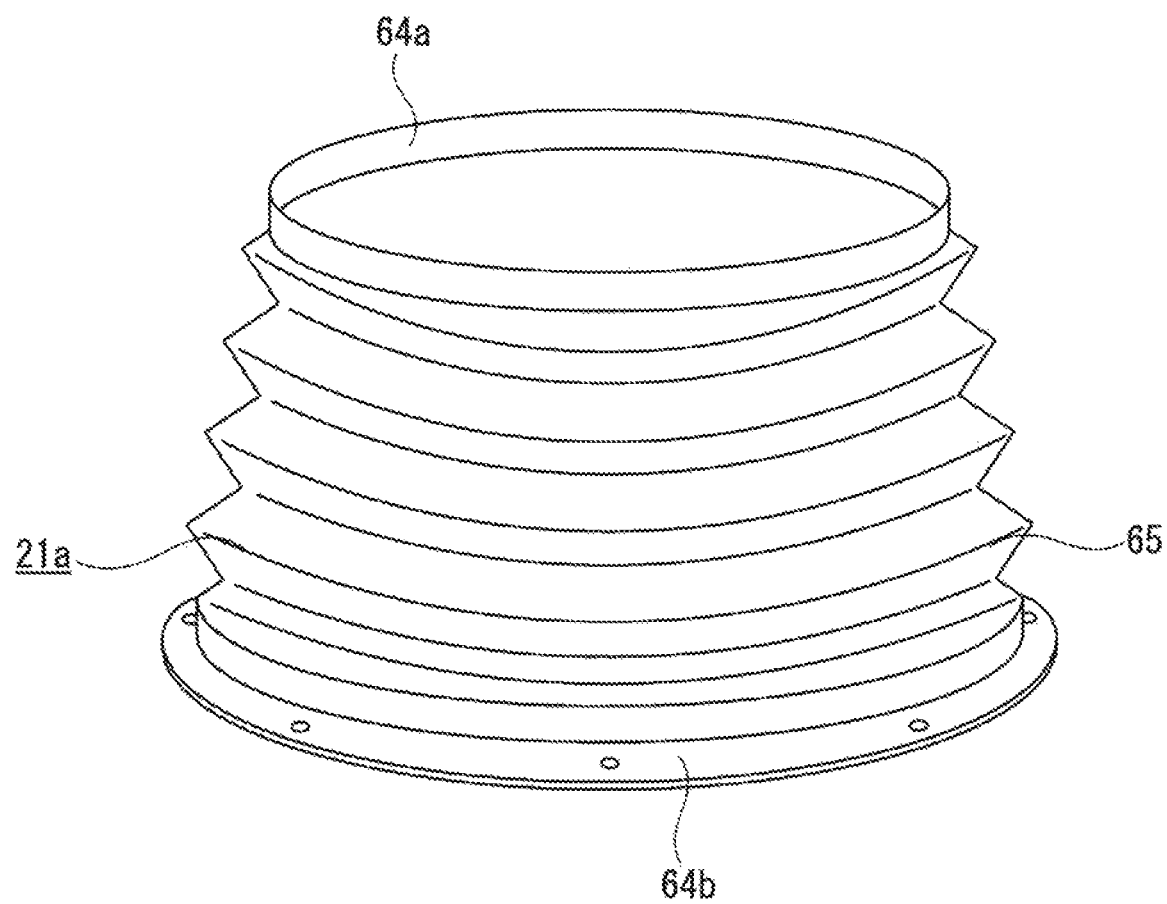
FIG. 7 is a perspective view showing a cover which has been taken out.
Figure 8:
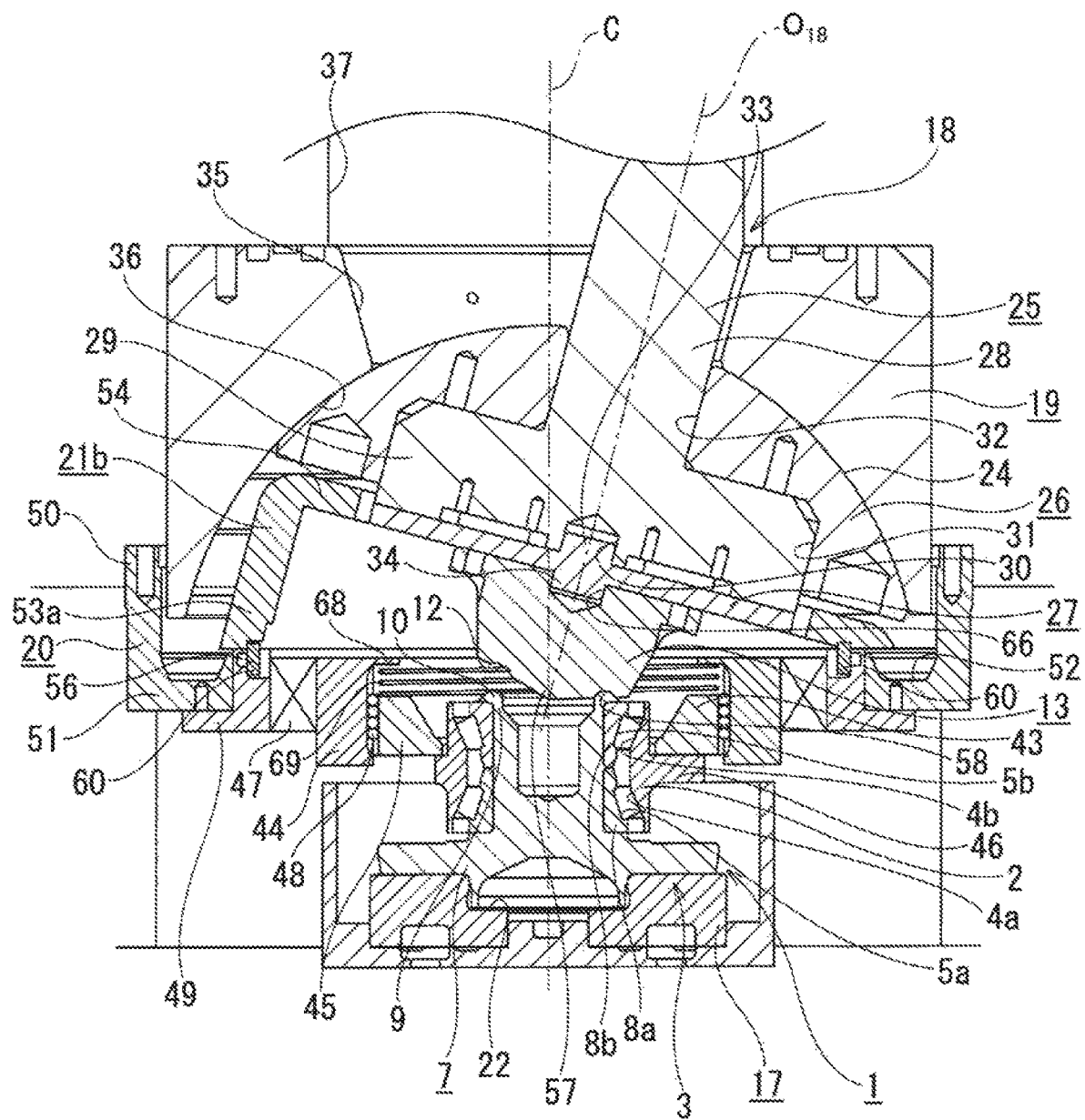
FIG. 8 is a view showing an rotary machining apparatus (rotary forging apparatus) according to a third example of the embodiment of the present invention, similar to FIG. 2.
Figure 9:
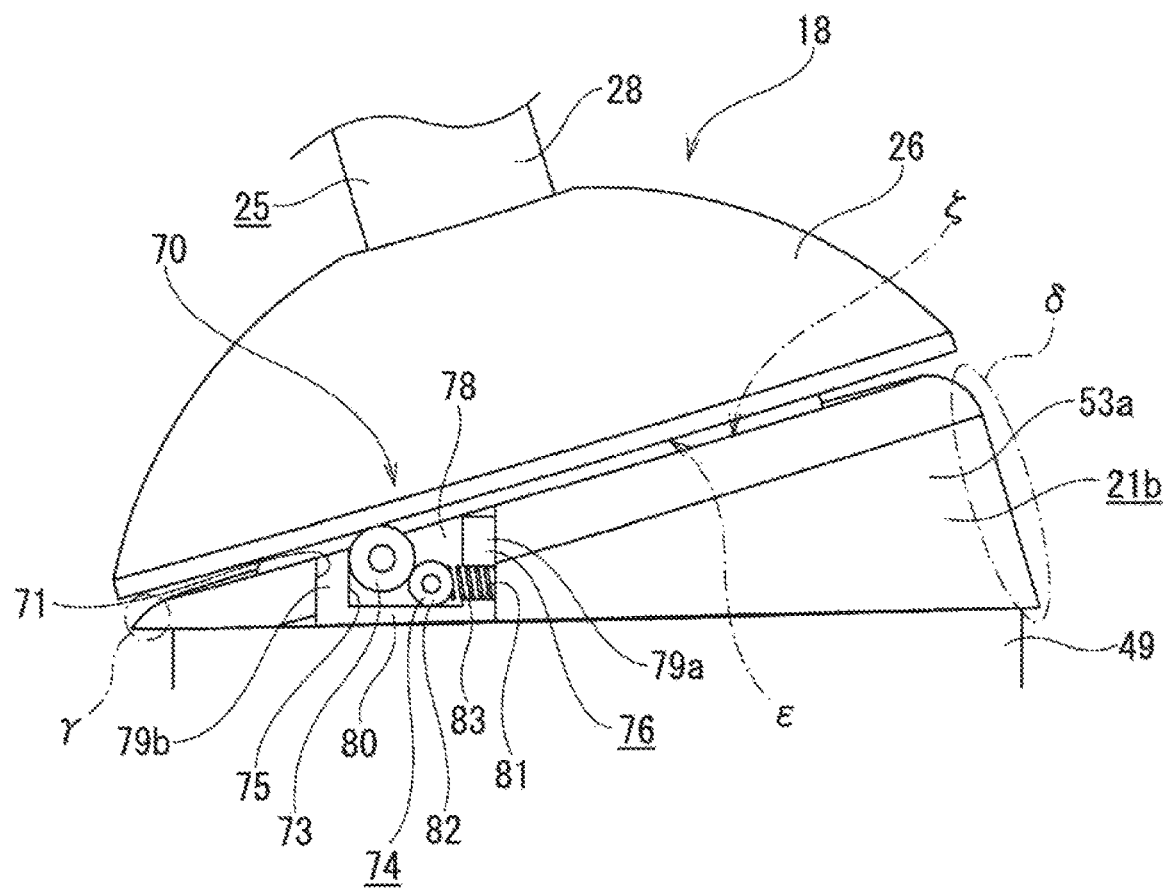
FIG. 9 is a side view showing a shaft-equipped spherical seat, the cover, a conversion mechanism, and a guide ring which have been taken out while having a lid portion of the conversion mechanism detached.
Figure 10:
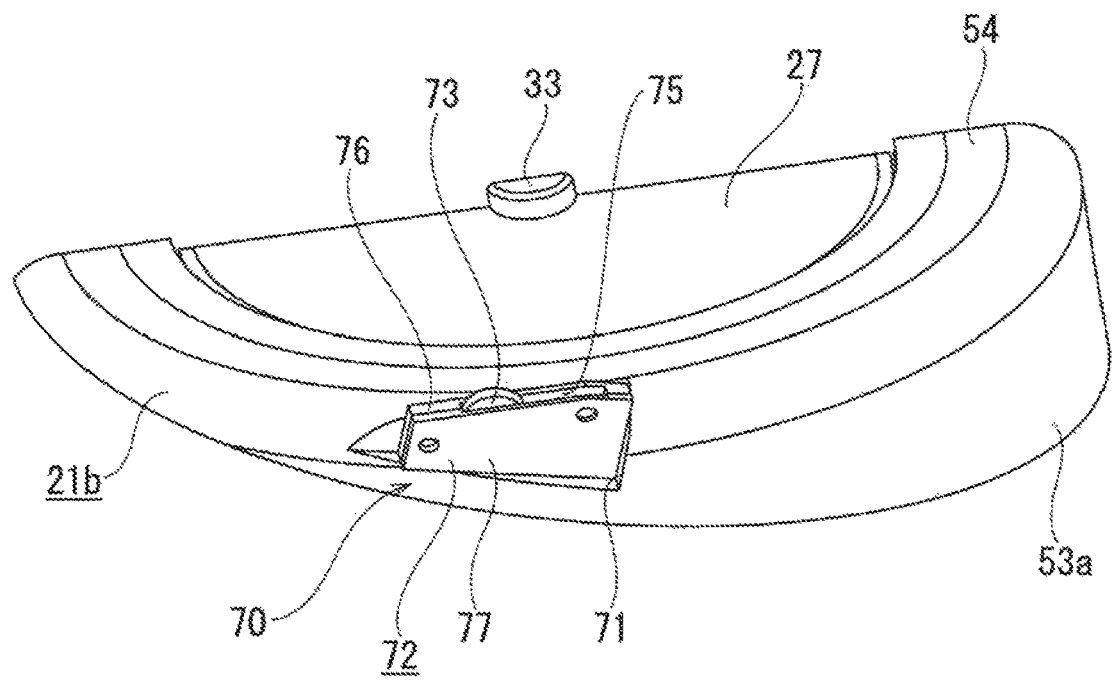
FIG. 10 is a perspective view showing the cover, the conversion mechanism, and the base plate which have been taken out.
Figure 11:
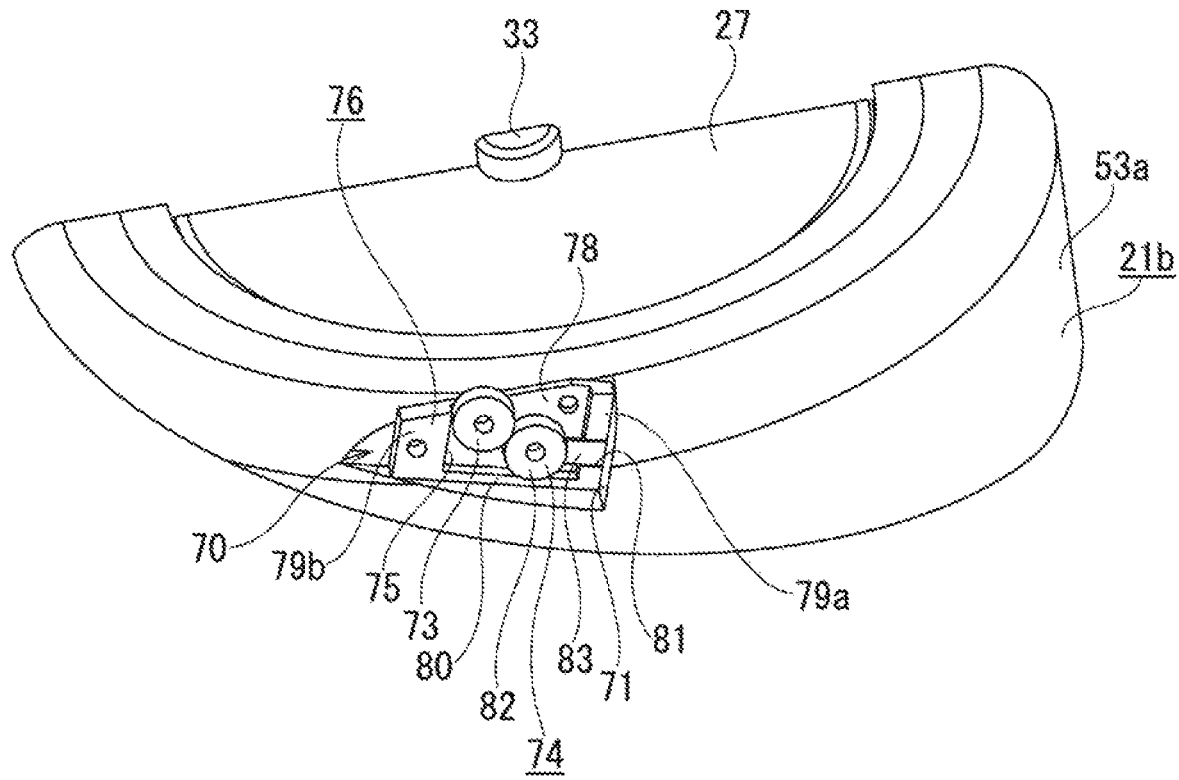
FIG. 11 is a view showing the lid portion of the conversion mechanism being detached, similar to FIG. 10.

FIGS. 6 and 7 show a second example of the embodiment of the present invention. In this example, a cover 21a includes a pair of rim portions 64a and 64b which individually have an annular shape, and a tubular portion 65 which is a bellows portion having a bellows shape provided throughout the whole circumference between the rim portions 64a and 64b. The tubular portion 65 is made of a flexible material such as a rubber or a cloth. However, there is no need for the tubular portion 65 to have a bellows shape, as long as no looseness occurs or looseness can be limited to the extent that it does not hinder swingy rotation of the shaft-equipped spherical seat 18 (refer to FIGS. 1 and 2) about the reference axis C even if looseness occurs when being extended and contracted in axial dimension. The tubular portion 65 may have a simply tubular shape or a conically tubular shape.

In this example, the rim portion 64a on the upper side of the cover 21a is supported by and fixed to the outer circumferential surface of the one axial end portion (lower end portion) of a flange portion 29a of a shaft main body 25a, and the rim portion 64b on the lower side is rotatably placed on the upper surface of the guide ring 49 via thrust rolling bearings 63. However, the rim portion 64b on the lower side can be placed on the upper surface of the outer rings of the plurality of radial rolling bearings of which the central axes are disposed in the radial direction about the reference axis C, as in the structure of the first example of the embodiment.

In such a case of the present example as well, during machining of the caulking portion 10 (refer to FIGS. 1 and 2), the axially inner end portion of the hub unit bearing 1, the outer ring rotation mechanism 43 present around this hub unit bearing 1, the radial bearing 47 (refer to FIG. 1), and the upper end portion of the guide ring 49 can be covered with the cover 21a. Therefore, the ambient environment of the hub unit bearing 1 can be prevented from being adversely affected by lubricating oil which has flowed out from the spherical engagement portion between the spherical convex portion 24 and the spherical concave portion 36.

In addition, in this example, a part (part surrounded by a chain line A in FIG. 6) of the tubular portion 65 constituted in a bellows shape of which the phase in the circumferential direction coincides with that of a part having a short distance between the outer circumferential surface of the flange portion 29a and the upper surface of the guide ring 49 is decreased in axial dimension and is slightly loosened, thereby being deformed to enter the inside of the annular recess portion 52. Accordingly, even when the cover 21a is mounted between the shaft-equipped spherical seat 18 (refer to FIGS. 1 and 2) and the guide ring 49, the shaft-equipped spherical seat 18 can perform swingy rotation.

In this example, the lower end portion of the cover 21a is rotatably supported with respect to the guide ring 49. However, in place thereof or in addition thereto, the upper end portion of the cover 21a can also be constituted to be rotatably supported with respect to (the shaft main body of) the shaft-equipped spherical seat 18. The constitutions and operational effects of other parts are similar to those of the first example of the embodiment.

Third Example of Embodiment

FIGS. 8 to 11 show a third example of the embodiment of the present invention. Similar to the cover 21 of the first example of the embodiment, a cover 21b of the present example includes a covering portion 53a which has an obliquely cut tubular shape, and the inward flange portion 54 which is bent radially inward from the upper end portion of this covering portion 53a. Similar to the case of the first example of the embodiment, the lower end surface of the covering portion 53a of the cover 21 is placed on the upper surface of the guide ring 49 via the plurality of radial rolling bearings 60. In contrast, unlike the case of the first example of the embodiment, the radially inner end portion of the inward flange portion 54 is not supported with respect to the shaft-equipped spherical seat 18 and faces the outer circumferential surface of the base plate 27 via a gap throughout the whole circumference. The shaft-equipped spherical seat (swinging body) 18 is installed to face the surface of the support body 17 intersecting the predetermined axis and performs swinging movement with respect to the workpiece (machining subject) 1, For example, the predetermined axis is the reference axis C and/or the central axis (rotation axis) of the cover 21.

The rotary forging apparatus 15 of the present example includes a conversion mechanism 70. The conversion mechanism 70 is disposed between the shaft-equipped spherical seat 18 and the cover 21b and converts a force input in response to swingy rotation (revolution) of the shaft-equipped spherical seat 18 about the reference axis C into a force for rotating the cover 21b about the reference axis C. The conversion mechanism 70 is disposed between a part of the covering portion 53a of the cover 21b deviating from a part having the greatest axial dimension (part surrounded by a chain line γ in FIG. 9) and a part having the shortest axial dimension (part surrounded by a chain line δ in FIG. 9), and the one axial end surface (surface which is indicated with a chain-line arrow c and is directed obliquely downward to the right in FIG. 9) of the spherical convex seat 26 of the shaft-equipped spherical seat 18. In this example, a cut portion 71 opening on the outer circumferential surface of the covering portion 53a and the axially opposite end surface (surface which is indicated with a chain-line arrow ζ and is directed obliquely upward to the left in FIG. 9) is formed in a part of the covering portion 53a of the cover 21b slightly deviating in the circumferential direction about the reference axis C from the part having the shortest axial dimension, and the conversion mechanism 70 is disposed on the inner side of the portion 71. The conversion mechanism 70 includes a casing 72, an input member (first member, roller) 73, and an output mechanism 74. As an example, the conversion mechanism 70 is provided in the cover 21b, and the cover 21b includes the conversion mechanism 70. The cover 21b has the covering portion (cover main body) 53a and the input member (first member) 73 which is provided at least at one place in the covering portion 53a and is pressed by the shaft-equipped spherical seat (swinging body) 18 in response to swinging movement of the shaft-equipped spherical seat (swinging body) 18.

The casing 72 includes an accommodating recess portion 75 which is constituted in a substantially trapezoidal shape in a side view, opens on the upper surface, and is recessed in the axial direction of the reference axis C. The casing 72 is supported by and fixed to the inner side of the cut portion 71 of the cover 21b. In this example, the casing 72 includes a first casing element 76 and a second casing element 77.

The first casing element 76 includes a side plate portion 78 having a substantially trapezoidal plate shape, a pair of wall portions 79a and 79b protruding from both end portions (both right and left end portions in FIG. 9) on the inner side surface of the side plate portion 78, and a bottom portion 80 protruding from the lower end portion on the inner side surface of the side plate portion 78 and interlocking the lower end portions of the pair of wall portions 79a and 79b with each other. The first casing element 76 has a recess hole 81 opening on both side surfaces (both right and left side surfaces in FIG. 9) of the wall portion 79a on one side (right side in FIGS. 9 to 11) and the distal end surface in a part of the pair of wall portions 79a and 79b near the lower end of the wall portion 79a on one side.

The second casing element 77 has a substantially trapezoidal plate shape and has the same contour shape as the side plate portion 78 of the first casing element 76.

The casing 72 is realized by causing the first casing element 76 and the second casing element 77 to be coupled and fixed to each other through screwing or the like in a state where the inner side surface of the second casing element 77 abuts the distal end surfaces of the pair of wall portions 79a and 79b and the bottom portion 80 of the first casing element 76.

The input member 73 is constituted in a tubular shape and its central axis is disposed in a direction orthogonal to the central axis of the cover 21b and an imaginary plane (plane parallel to the paper in FIG. 9) including a part having the greatest axial dimension and a part having the shortest axial dimension in the covering portion 53a. Specifically, in this example, a radial ball bearing is used as the input member 73. However, the input member 73 is not limited to a radial ball bearing, as long as it has a tubular shape and the outer circumferential surface has hardness (for example, hardness of HRC40 or higher) to the extent that wear or plastic deformation can be prevented. A sliding bearing having a tubular shape or a roller having a columnar shape can be used. In a state where a part of the outer circumferential surface protrudes from an opening portion of the accommodating recess portion 75, the input member 73 is disposed on the inner side of the accommodating recess portion 75 to be able to be displaced in the axial direction of the reference axis C, that is, the up-down direction along the inner side surface of the wall portion 79b on the other side (left side in FIGS. 9 to 11) of the pair of wall portions 79a and 79b. In this example, the central axis of the input member 73 is disposed in a direction orthogonal to the central axis of the cover 21b and an imaginary plane including a part having the greatest axial dimension and a part having the shortest axial dimension in the covering portion 53a. A part of the outer circumferential surface of the input member 73 protruding from the opening portion of the accommodating recess portion 75 abuts the one axial end surface of the spherical convex seat 26 of the shaft-equipped spherical seat 18 in a state where the conversion mechanism 70 is assembled between the shaft-equipped spherical seat 18 and the cover 21b.

The output mechanism 74 includes an intermediate member (second member) 82 and an elastic member (third member) 83.

The intermediate member 82 is constituted in a tubular shape and its central axis is disposed in a direction parallel to the central axis of the input member 73. Specifically, in this example, similar to the input member 73, a radial ball bearing is used as the intermediate member 82. However, the input member 73 is not limited to a radial ball bearing, as long as the outer circumferential surface has hardness (for example, hardness of HRC40 or higher) to the extent that wear or plastic deformation can be prevented. A sliding bearing having a tubular shape or a roller having a columnar shape can be used. The intermediate member 82 is disposed on the inner side of the accommodating recess portion 75 to be able to be displaced in a direction orthogonal to the reference axis C and the central axis of the intermediate member 82, that is, the horizontal direction (traverse direction in FIG. 9) along the bottom surface of the accommodating recess portion 75 (upper surface of the bottom portion 80).

The elastic member 83 is disposed on the inner side of the recess hole 81 and between the outer circumferential surface of the intermediate member 82 and the inner side surface of the cut portion 71. In this example, a torsion coil spring is used as the elastic member 83. However, the elastic member 83 is not limited thereto, and a rubber or the like can be used.

When the conversion mechanism 70 is assembled, first, the elastic member 83 is disposed on the inner side of the recess hole 81 provided in the first casing element 76. Next, the intermediate member 82 is disposed such that the outer circumferential surface of the intermediate member 82 abuts the opposite end surface (left end surface in FIG. 9) of the elastic member 83 and the upper surface of the bottom portion 80, and the input member 73 is disposed such that the outer circumferential surface of the input member 73 abuts the inner side surface of the wall portion 79*b* on the other side and the outer circumferential surface of the intermediate member 82. Then, the inner side surface of the second casing element 77 is caused to abut the pair of wall portions 79*a* and 79*b* of the first casing element 76 and the distal end surface of the bottom portion 80, and the first casing element 76 and the second casing element 77 are coupled and fixed to each other through screwing or the like. Next, the conversion mechanism 70 is supported by and fixed to the inner side of the cut portion 71 of the cover 21*b*. The assembly sequences described above can be changed, as long as no contradiction is caused. Specifically, for example, after the first casing element 76 and the second casing element 77 are coupled to each other, the input member 73 and the intermediate member 82 can be disposed on the inner side of the accommodating recess portion 75, and the elastic member 83 can be disposed on the inner side of the recess hole 81.

Moreover, the rotary forging apparatus 15 of the present example further includes a damping mechanism having the same constitution as the conversion mechanism 70 in a part symmetrical to the part in which the conversion mechanism 70 is disposed, regarding the central axis of the cover 21*b* and an imaginary plane including a part having the greatest axial dimension and a part having the shortest axial dimension in the covering portion 53*a*.

When the shaft-equipped spherical seat 18 is subjected to swingy rotation about the reference axis C using the rotary forging apparatus 15 of the present example in order to form the caulking portion 10 in the axially inner end portion of the hub main body 7, the input member 73 of the conversion mechanism 70 is pressed by the one axial end surface of the spherical convex seat 26 of the shaft-equipped spherical seat 18 in a direction downward as it goes toward the front side (right side in FIG. 9) in the rotation direction about the reference axis C of the shaft-equipped spherical seat 18. Accordingly, the input member 73 is displaced downward along the inner side surface of the wall portion 79*b* on the other side. When the input member 73 is displaced downward, the intermediate member 82 is pressed by the input member 73, and the intermediate member 82 displaced in the horizontal direction along the bottom surface of the accommodating recess portion 75. When the intermediate member 82 is displaced in the horizontal direction, the inner side surface of the cut portion 71 of the cover 21*b* is pressed by the intermediate member 82 via the elastic member 83, and the cover 21*b* is rotated in the same direction as the direction of swingy rotation of the shaft-equipped spherical seat 18 about the reference axis C. In the rotary forging apparatus 15, the swinging body (shaft-equipped spherical seat 18, the pressing die 13) is installed such that its axis is inclined with respect to the reference axis, and the inclined axis moves around the reference axis. Relative rotation of the cover 21*b* is advantageous for appropriate environmental protection against swinging movement. For example, the position and/or the area of a cover target region changes in accordance with a change in posture of the shaft-equipped spherical seat (swinging body) 18 in swinging movement. In this case as well, the changing target region is appropriately covered by the cover 21*b* relatively rotating with respect to the shaft-equipped spherical seat (swinging body) 18. For example, the input member (first member) 73 provided in the cover 21*b* is pressed by the shaft-equipped spherical seat (swinging body) 18 based on movement of the shaft-equipped spherical seat (swinging body) 18, and the cover 21*b* rotates due to a force received from the shaft-equipped spherical seat (swinging body) 18. Since the cover 21*b* has the asymmetrical circumferential wall 53*a* around the predetermined axis, a predetermined area is appropriately protected against swinging movement of the shaft-equipped spherical seat (swinging body) 18.

As described above, according to the rotary forging apparatus 15 of the present example, a force input in response to swingy rotation (revolution) of the shaft-equipped spherical seat 18 about the reference axis C can be converted into a force for rotating the cover 21*b* about the reference axis C using the conversion mechanism 70. Accordingly, when starting machining for forming the caulking portion 10 in the axially inner end portion of the hub main body 7, the cover 21*b* can start to be smoothly rotated. That is, an initial torque when the rotary forging apparatus 15 starts machining can be limited to be small.

In addition, the rotary forging apparatus 15 of the present example includes the damping mechanism having the same structure as the conversion mechanism 70 in a part symmetrical to the part in which the conversion mechanism 70 is disposed, regarding the central axis of the cover 21*b* and an imaginary plane including a part having the greatest axial dimension and a part having the shortest axial dimension in the covering portion 53*a*. Accordingly, even when swingy rotation of the shaft-equipped spherical seat 18 about the reference axis C stops after machining of the caulking portion 10 is completed, it is possible to prevent the axially opposite side surface of the inward flange portion 54 of the cover 21*b* from vigorously colliding with the one axial end surface of the spherical convex seat 26 and to prevent the cover 21*b* from being deformed.

The disposing position and the structure of the damping mechanism is not particularly limited, as long as the axially opposite side surface of the inward flange portion 54 of the cover 21*b* can be prevented from vigorously colliding with the one axial end surface of the spherical convex seat 26 to the extent that the cover 21*b* is deformed when swingy rotation of the shaft-equipped spherical seat 18 stops. Specifically, for example, the damping mechanism can be formed integrally with the cover or can be formed separately from the cover to become a protrusion portion protruding to the axially opposite side beyond the axially opposite side surface of the inward flange portion 54.

Figure 12:
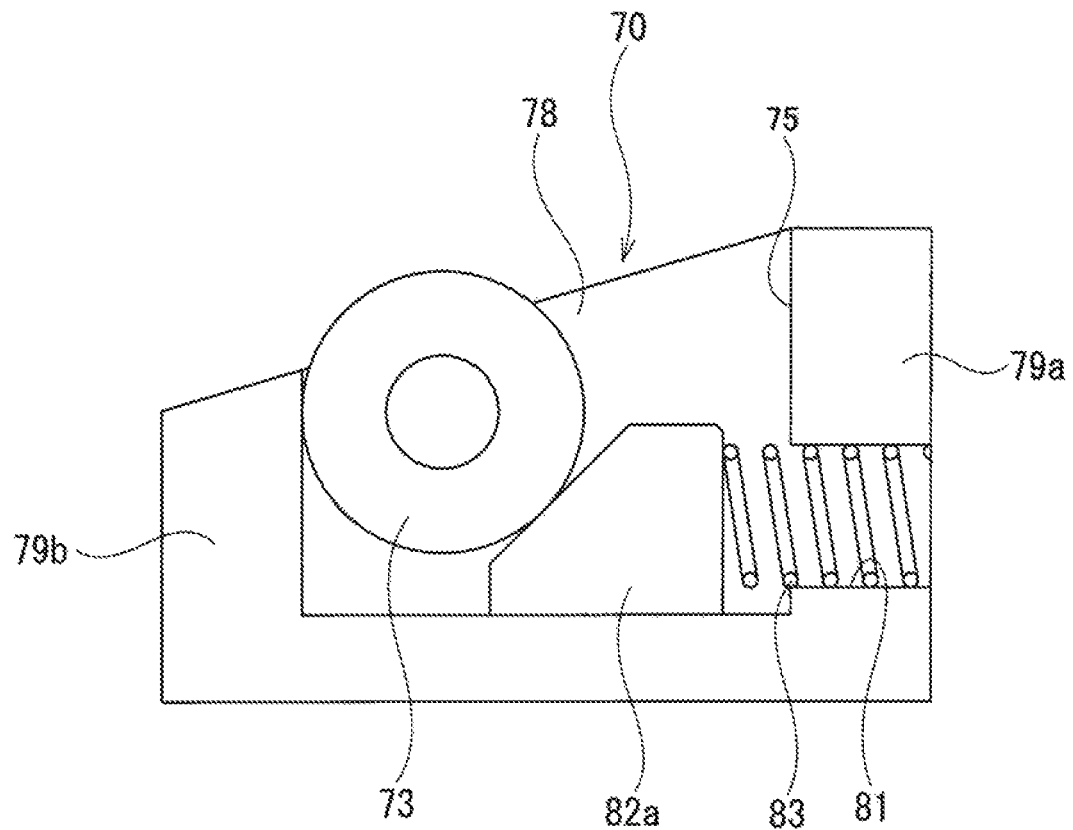
FIG. 12 is a schematic view showing another example of the conversion mechanism.

In addition, in this example, a member having a tubular outer circumferential surface is used as the intermediate member 82 of the output mechanism 74 constituting the conversion mechanism 70. However, the member is not limited thereto, as long as it can be displaced in the horizontal direction along the bottom surface of the accommodating recess portion 75 in accordance with the input member 73 having a tubular outer circumferential surface being displaced downward. For example, as shown in FIG. 12, an intermediate member 82*a* having a wedge shape can be used. The constitutions and operational effects of other parts are similar to those of the first example of the embodiment.

According to the embodiment, the rotary machining apparatus (15) includes a reference axis, a support body (17), a shaft-equipped spherical seat (18), a spherical concave seat (19), and a cover (21, 21*a*, or 21*b*). The support body (17) supports a machining subject (1) coaxial with the reference axis. The shaft-equipped spherical seat (18) has a machining portion (12) which has a central axis inclined with respect to the reference axis and is formed in one axial end portion, and a spherical convex portion (24) which is formed in an axially intermediate portion and has a partially spherical shape directed to an axially opposite end side. The spherical concave seat (19) has an insertion hole (35) through which a part of the shaft-equipped spherical seat (18) on the axially opposite end side (part of the shaft-equipped spherical seat (18) positioned on the axially opposite end side with respect to the spherical convex portion (24)) is inserted, and a spherical concave portion (36) which spherically engages with the spherical convex portion (24). The cover (21, 21*a*, or 21*b*) prevents lubricating oil for lubricating a spherical engagement portion between the spherical convex portion (24) and the spherical concave portion (36) from adversely affecting an ambient environment of the machining subject (1).

The rotary machining apparatus (15) can further include a guide ring (49) that is disposed around the machining subject (1). In this case, the cover (21, 21*a*, or 21*b*) is disposed between the guide ring (49) and the part of the shaft-equipped spherical seat (18) on the one axial side.

The cover (21, 21*a*, or 21*b*) can include a covering portion (53 or 53*a*) having an obliquely cut tubular shape of which one axial end surface is supported or placed on the guide ring (49) to be able to rotate about the reference axis, and an inward flange portion (54) being bent radially inward from an axially opposite end portion of the covering portion (53 or 53*a*).

The one axial end surface of the covering portion (53 or 53*a*) can be placed on the guide ring (49) via a plurality of radial rolling bearings (60) disposed at equal intervals in a circumferential direction about the reference axis in a state where the central axes thereof are disposed in a radial direction about the reference axis.

An axially opposite side surface of the inward flange portion (54) can be present in a first imaginary plane orthogonal to the central axis of the shaft-equipped spherical seat (18), and the one axial end surface of the covering portion (53 or 53*a*) can be present in a second imaginary plane orthogonal to the reference axis.

A radially inner end portion of the inward flange portion (54) can be rotatably supported by rolling bearings (55) in a part of the shaft-equipped spherical seat (18) on the one axial end side.

Alternatively, the rotary machining apparatus (15) can include a conversion mechanism (70) that is provided between the shaft-equipped spherical seat (18) and the cover (21, 21*a*, or 21*b*) and converts a force input in response to swingy rotation of the shaft-equipped spherical seat (18) about the reference axis into a force for rotating the cover (21, 21*a*, or 21*b*) about the reference axis. In this case, the conversion mechanism (70) can include an accommodating recess portion (75), an input member (73), and an output mechanism (74). The accommodating recess portion (75) is disposed in the cover (21, 21*a*, or 21*b*) at a position radially deviating from the central axis of the shaft-equipped spherical seat (18), opens on the axially opposite end surface of the cover (21, 21*a*, or 21*b*), and is recessed in an axial direction of the reference axis. The input member (73) is disposed inside the accommodating recess portion (75) to be able to be displaced in the axial direction of the reference axis and is pressurized by a surface of the shaft-equipped spherical seat (18) directed to the axially opposite side. The output mechanism (74) pressurizes the cover (21, 21*a*, 21*b*) in a rotation direction about the reference axis in response to displacement of the input member (73) toward the machining subject (1) side in the axial direction of the reference axis. Additionally, the output mechanism (74) can include a tubular or columnar intermediate member (82 or 82*a*) which is disposed inside the accommodating recess portion (75) to be able to be displaced in the axial direction of the reference axis and a direction orthogonal to a central axis of the input member (73) of which an outer circumferential surface is pressurized by the input member (73), and an elastic member (83) which is disposed between the intermediate member (82 or 82*a*) and a side surface of the accommodating recess portion (75). The rotary machining apparatus (15) can include a damping mechanism (70) that is provided between the shaft-equipped spherical seat (18) and the cover (21, 21*a*, or 21*b*) in a part on a side opposite to a part in which the conversion mechanism (70) is disposed, regarding the central axis of the shaft-equipped spherical seat (18) and an imaginary plane including a part having a longest axial dimension and a part having a shortest axial dimension in the covering portion (53 or 53*a*). In this case, specifically, the damping mechanism (70) is disposed between the shaft-equipped spherical seat (18) and the cover (21, 21*a*, or 21*b*) at a position symmetrical with respect to the part in which the conversion mechanism (70) is disposed, regarding the central axis of the shaft-equipped spherical seat (18) and the imaginary plane including a part having a longest axial dimension and a part having a shortest axial dimension in the covering portion (53 or 53*a*) and has the same constitution as the conversion mechanism (70).

Alternatively, the cover (21, 21*a*, or 21*b*) can be constituted of a flexible material such as a rubber or a cloth and/or can be constituted to be partially extensible and contractible in axial dimension in the circumferential direction. In this case, the one axial end portion of the cover (21, 21*a*, or 21*b*) is supported or placed on the guide ring (49) to be able to rotate about the reference axis and/or the axially opposite end portion of the cover (21, 21*a*, or 21*b*) is supported by a part of the shaft-equipped spherical seat (18) on the one axial side to be able to rotate about the central axis of the shaft-equipped spherical seat (18). Specifically, for example, the cover (21, 21*a*, or 21*b*) can have a bellows portion.

It is preferable that an inclination angle of the central axis of the shaft-equipped spherical seat (18) with respect to the reference axis be 15 degrees or greater.

In the rotary machining apparatus (15) according to the aspect of the present invention, it is preferable that the shaft-equipped spherical seat (18) include a shaft main body (25 or 25*a*), a base plate (27 or 27*a*), and a pressing die (13). The shaft main body (25 or 25*a*) has a central axis inclined with respect to the reference axis, and the spherical convex portion (24). The base plate (27 or 27*a*) has a holding recess portion (67) on a side surface on the one axial end side and is coupled and fixed to a side surface of the shaft main body (25 or 25*a*) on the one axial end side. The pressing die (13 or 13a) has a machining portion (12 or 12a) in one axial end portion and is coupled and fixed to the base plate 27 or 27a) by causing an axially opposite end portion to be internally fitted into the holding recess portion (67) without wobbling in a state where radial positioning with respect to the base plate (27 or 27a) is ensured.

According to another aspect of the present invention, an rotary machining apparatus (15) includes a support body (17) that has a surface intersecting a predetermined axis and supports a workpiece (1), a swinging body (18) that is installed to face the surface of the support body (17) and performs swinging movement with respect to the workpiece (1), and a cover (21 or 21b) that is installed to be able to rotate around the predetermined axis and relatively rotates around the predetermined axis with respect to the swinging body in response to swinging movement of the swinging body.

The cover (21 or 21b) can have an asymmetrical circumferential wall (53 or 53a) around the predetermined axis.

The cover (21 or 21b) can have a cover main body (53 or 53a) and a first member (73) which is provided at least at one place in the cover main body (53 or 53a) and is pressed by the swinging body (18) in response to swinging movement of the swinging body (18).

According to another aspect of the present invention, a hub unit bearing (1) which becomes a target of a method of manufacturing a hub unit bearing includes an outer ring (2) which has a plurality of rows of outer ring trajectories on an inner circumferential surface, a hub (3) which has a plurality of rows of inner ring trajectories on an outer circumferential surface, and a plurality of rollers (6) which are disposed to be able to roll in each of the rows between the plurality of rows of outer ring trajectories and the plurality of rows of inner ring trajectories. The hub (3) includes an inner ring (8a or 8b) and a hub main body (7). The inner ring (8a or 8b) has an inner ring trajectory of the plurality of rows of inner ring trajectories on an axially inner side provided on the outer circumferential surface. The hub main body (7) has an inner ring trajectory of the plurality of rows of inner ring trajectories on an axially outer side which is provided on an outer circumferential surface of an axially intermediate portion directly or via a different member, a cylindrical portion (9) which is present on a side axially inward from the inner ring trajectory on the axially outer side and into which the inner ring is externally fitted, and a caulking portion (10) which is bent radially outward from an axially inner end portion of the cylindrical portion (9) and restrains an axially inner end surface of the inner ring (8a or 8b).

In the method of manufacturing a hub unit bearing according to the aspect of the present invention, the caulking portion (10) is formed by causing the cylindrical portion (9) provided in the axially inner end portion of the hub main body (7) before the caulking portion (10) is formed to be plastically deformed radially outward using the rotary machining apparatus (15) described above.

According to another aspect of the present invention, a vehicle which becomes a target of a method of manufacturing a vehicle includes a hub unit bearing (1). In this method of manufacturing a vehicle, the hub unit bearing (1) is manufactured by the method of manufacturing a hub unit bearing described above.

REFERENCE SIGNS LIST

1 Hub unit bearing (workpiece, machining subject)
2 Outer ring
3 Hub
4a, 4b Outer ring trajectory
5a, 5b Inner ring trajectory
6 Roller
7 Hub main body
8a, 8b Inner ring
9 Cylindrical portion
10 Caulking portion
12 Machining portion
13, 13a Pressing die (machining tool)
15 Rotary machining apparatus (rotary forging apparatus)
16 Frame
17 Support body (support jig)
18 Shaft-equipped spherical seat (swinging body)
19 Spherical concave seat
20 Oil pan
21, 21a, 21b Cover
22 Support recess portion
23 Lifting/lowering table
24 Spherical convex portion
25, 25a Shaft main body
26 Spherical convex seat
27, 27a Base plate
28 Shaft portion
29, 29a Flange portion
30 First positioning recess portion
31 Fitting recess portion
32 Penetration hole
33 First positioning bulging portion
34 Second positioning bulging portion
35 Insertion hole
36 Spherical concave portion
37 Stepped hole
38 Driving mechanism
39 Rotor
40 Bearing
41 Bearing device
42 Holding hole
43 Outer ring rotation mechanism
44 Driving ring
45 Driving jig
46 Coupling flange
47 Radial bearing
48 Ball spline
49 Guide ring
50 Cylindrical portion
51 Circular ring portion
52 Annular recess portion
53 Covering portion (cover main body, circumferential wall)
54 Inward flange portion
55 Rolling hearing
57 Protruding portion
58 Recessed groove
60 Radial rolling bearing
61 Cylindrical portion
62 Tubular member
64a, 64b Rim portion
63 Thrust rolling bearing
65 Tubular portion
66 Second positioning recess portion
67 Holding recess portion
68 Inward flange portion
69 Torsion coil spring
70 Conversion mechanism
71 Cut portion
72 Casing
73 Input member (first member)

74 Output mechanism
75 Accommodating recess portion
76 First casing element
77 Second casing element
78 Side plate portion
79a, 79b Wall portion
80 Bottom portion
81 Recess hole
82, 82a Intermediate member
83 Elastic member
100 Hub unit bearing
101 Knuckle
102 Outer ring
103 Wheel
104 Braking rotor
105 Hub
106 Roller
107a, 107b Outer ring trajectory
108 Stationary flange
109 Support hole
110 Via hole
111 Bolt
112a, 112b Inner ring trajectory
113 Rotation flange
114 Attachment hole
115 Stud
116 Via hole
117 Via hole
118 Nut
119 Retainer
120 Hub main body
121 Inner ring
122 Cylindrical portion
123 Caulking portion
124 Rotary caulking apparatus
125 Machining portion
126 Pressing die
127 Holder

The invention claimed is:

1. A method of manufacturing a vehicle, comprising:
manufacturing a hub unit bearing; and
assembling the vehicle by using the hub unit bearing,
the hub unit bearing including:
an outer ring which has a plurality of rows of outer ring trajectories on an inner circumferential surface;
a hub which has a plurality of rows of inner ring trajectories on an outer circumferential surface; and
a plurality of rollers which are disposed to be able to roll in each of the rows between the plurality of rows of outer ring trajectories and the plurality of rows of inner ring trajectories,
wherein the hub includes an inner ring and a hub main body,
wherein the inner ring has an inner ring trajectory of the plurality of rows of inner ring trajectories on an axially inner side provided on the outer circumferential surface, and
wherein the hub main body has an inner ring trajectory of the plurality of rows of inner ring trajectories on an axially outer side which is provided on an outer circumferential surface of an axially intermediate portion directly or via a different member, a cylindrical portion which is present on a side axially inward from the inner ring trajectory on the axially outer side and into which the inner ring is externally fitted, and a caulking portion which is bent radially outward from an axially inner end portion of the cylindrical portion and restrains an axially inner end surface of the inner ring,
the manufacturing of the hub unit bearing comprising:
forming the caulking portion using a rotary machining apparatus,
the rotary machining apparatus comprising:
a support body that has a surface intersecting a predetermined axis and supports the cylindrical portion as a workpiece;
a swinging body that is installed to face the surface of the support body and performs swinging movement with respect to the cylindrical portion; and
a cover that is installed to be able to rotate around the predetermined axis and relatively rotates around the predetermined axis with respect to the swinging body in response to the swinging movement,
wherein the swinging body has an inclined axis that is arranged inclined with respect to the predetermined axis,
wherein, in the swinging movement, a change of a posture of the swinging body occurs so that the inclined axis moves around the predetermined axis,
wherein the cover has a cover main body and a first member having a bearing, the first member being provided at least at one place in the cover main body such that the first member is pressed by the swinging body in the response to the change of the posture of the swinging body in the swinging movement and moves around the predetermined axis and with respect to the swinging body,
wherein the cover is configured to rotate by a force received from the swinging body via the first member in the swinging movement, and
wherein the forming of the caulking portion comprises performing the swinging movement of the swinging body and rotating the cover in response to the swinging movement of the swinging body.

2. A method of manufacturing a vehicle, comprising:
manufacturing a hub unit bearing; and
assembling the vehicle by using the hub unit bearing,
the hub unit bearing including:
an outer ring which has a plurality of rows of outer ring trajectories on an inner circumferential surface;
a hub which has a plurality of rows of inner ring trajectories on an outer circumferential surface; and
a plurality of rollers which are disposed to be able to roll in each of the rows between the plurality of rows of outer ring trajectories and the plurality of rows of inner ring trajectories,
wherein the hub includes an inner ring and a hub main body,
wherein the inner ring has an inner ring trajectory of the plurality of rows of inner ring trajectories on an axially inner side provided on the outer circumferential surface, and
wherein the hub main body has an inner ring trajectory of the plurality of rows of inner ring trajectories on an axially outer side which is provided on an outer circumferential surface of an axially intermediate portion directly or via a different member, a cylindrical portion which is present on a side axially inward from the inner ring trajectory on the axially outer side and into which the inner ring is externally fitted, and a caulking portion which is bent radially outward from an axially inner end portion of the cylindrical portion and restrains an axially inner end surface of the inner ring, the manufacturing of the hub unit bearing comprising:
forming the caulking portion using a rotary machining apparatus,
the rotary machining apparatus comprising:
a reference axis;
a support body that supports the cylindrical portion as a machining subject coaxially with the reference axis;
a shaft-equipped spherical seat that has a machining portion which has a central axis inclined with respect to the reference axis and is formed in one axial end portion, and a spherical convex portion which is formed in an axially intermediate portion and has a partially spherical shape directed to an axially opposite end side;
a spherical concave seat that has an insertion hole through which a part of the shaft-equipped spherical seat on the axially opposite end side is inserted, and a spherical concave portion which spherically engages with the spherical convex portion; and
a cover that is configured to prevent lubricating oil for lubricating a spherical engagement portion between the spherical convex portion and the spherical concave portion from adversely affecting an ambient environment of the machining subject,
the cover is installed to relatively rotate around the reference axis with respect to the shaft-equipped spherical seat in response to swinging movement of the shaft-equipped spherical seat,
the cover has an asymmetrical circumferential wall around the reference axis,
a height of the circumferential wall varies depending on position in a circumferential direction around the reference axis, and
the forming of the caulking portion comprises performing the swinging movement of the swinging body and rotating the cover in response to the swinging movement of the swinging body.

* * * * *